US011836715B1

(12) United States Patent
Dinan et al.

(10) Patent No.: US 11,836,715 B1
(45) Date of Patent: Dec. 5, 2023

(54) METHODS AND SYSTEMS FOR DYNAMIC ROUTING OF ELECTRONIC TRANSACTION MESSAGES WHILE MAINTAINING TOKEN COMPATIBILITY

(71) Applicant: Worldpay, LLC, Symmes Township, OH (US)

(72) Inventors: Stephen E. Dinan, Austin, TX (US); James S. Osborn, Austin, TX (US); William J. Wied, Austin, TX (US)

(73) Assignee: Worldpay, LLC, Symmes Township, OH (US)

( * ) Notice: Subject to any disclaimer, the term of this patent is extended or adjusted under 35 U.S.C. 154(b) by 60 days.

(21) Appl. No.: 16/697,928

(22) Filed: Nov. 27, 2019

(51) Int. Cl.
*G06Q 20/36* (2012.01)

(52) U.S. Cl.
CPC ....... *G06Q 20/3678* (2013.01); *G06Q 20/363* (2013.01); *G06Q 20/3672* (2013.01); *G06Q 20/3676* (2013.01)

(58) Field of Classification Search
CPC ............................................. G06Q 20/02–027
See application file for complete search history.

(56) References Cited

U.S. PATENT DOCUMENTS

| 7,761,500 | B1* | 7/2010 | Eckert | H04L 67/563 |
| | | | | 709/239 |
| 10,387,879 | B2* | 8/2019 | Thomas | G06Q 20/4012 |
| 2008/0189214 | A1* | 8/2008 | Mueller | G06Q 20/20 |
| | | | | 705/72 |
| 2012/0271765 | A1* | 10/2012 | Cervenka | G06Q 20/12 |
| | | | | 705/44 |
| 2013/0151400 | A1* | 6/2013 | Makhotin | G06Q 20/3229 |
| | | | | 705/39 |
| 2018/0107994 | A1* | 4/2018 | Anderson | G06Q 20/102 |
| 2019/0109915 | A1* | 4/2019 | McPhee | G06Q 20/40 |
| 2020/0097963 | A1* | 3/2020 | Gomes | G06Q 20/38215 |
| 2020/0349639 | A1* | 11/2020 | Mousseau | G06Q 20/04 |
| 2022/0006670 | A1* | 1/2022 | Doney | H04L 12/4625 |

* cited by examiner

*Primary Examiner* — Jay Huang
(74) *Attorney, Agent, or Firm* — Bookoff McAndrews, PLLC

(57) ABSTRACT

Systems and methods are disclosed for dynamic routing of electronic transactions while maintaining token compatibility. One method comprises receiving a request message from a merchant system and determining a final destination payment processor based on a routing directive. Upon determining the final destination payment processor, the request message may be updated by updating a message destination to the final destination payment processor and replacing an initial token with a token that is compatible with the final destination payment processor. The updated request message may then be transmitted to a downstream entity for further processing.

17 Claims, 17 Drawing Sheets

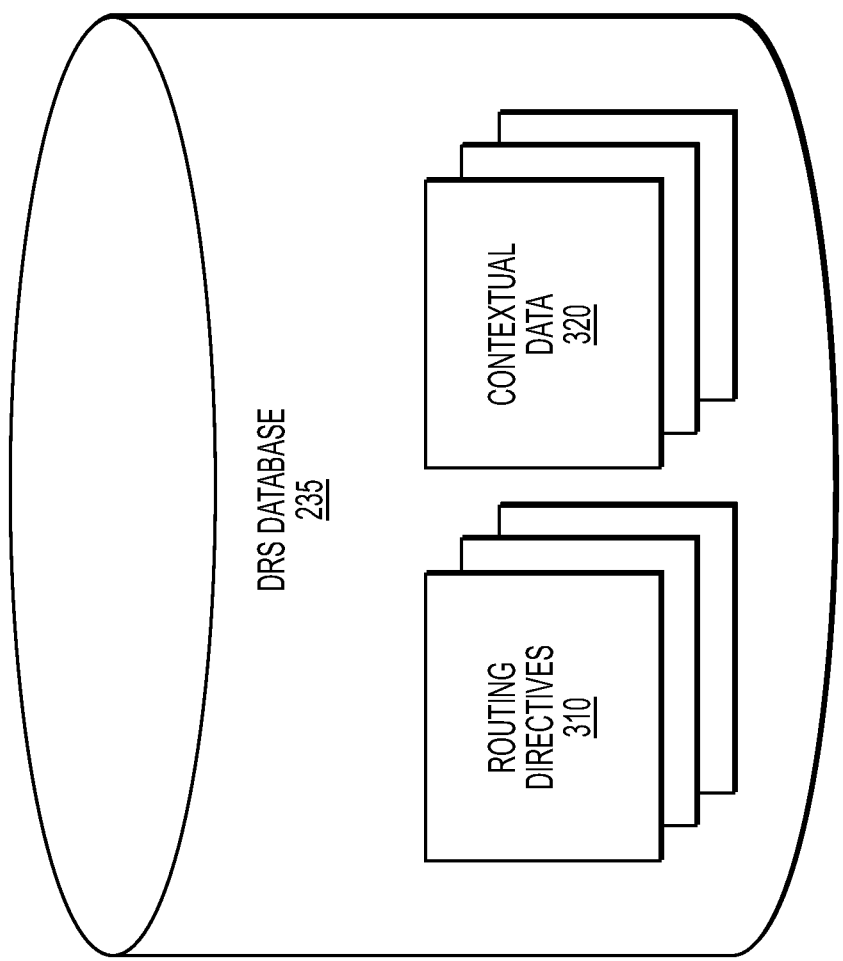

| MESSAGE TYPE (410) | ROUTING DIRECTIVE TYPE (420) | ERROR TYPE (STATUS CODE) (430) | DESTINATION SELECTION CRITERIA (440) |
|---|---|---|---|
| MESSAGES ORIGINATING FROM MERCHANT SYSTEM ASSOCIATED WITH MID = (****) | ERROR-BASED | 300 | CONNECTIVITY ERROR RATE, RESPONSE TIME WITHIN LAST 3 HOURS |
| | | 302 | CONNECTIVITY ERROR RATE, RESPONSE TIME WITHIN LAST 3 HOURS |
| | | 400 | PROCESSOR ERROR RATE, RESPONSE TIME WITHIN LAST 3 HOURS |
| | | 402 | PROCESSOR ERROR RATE, RESPONSE TIME WITHIN LAST 3 HOURS |
| | | 404 | PROCESSOR ERROR RATE, RESPONSE TIME WITHIN LAST 3 HOURS |
| MESSAGES ORIGINATING FROM MERCHANT SYSTEM ASSOCIATED WITH MCC = (****) | NON-ERROR-BASED | N/A | AVERAGE RESPONSE TIME BETWEEN NOW AND 2 HOURS PRIOR, LEAST COST |
| ALL MESSAGES | NON-ERROR-BASED | N/A | PERCENTAGE SPLIT ROUTING BETWEEN CANDIDATES BASED ON CONNECTIVITY ERROR RATE, PROCESSOR ERROR RATE, RESPONSE TIME WITHIN LAST 2 HOURS |
| ALL MESSAGES | NON-ERROR-BASED | N/A | SPLIT ROUTING BETWEEN CANDIDATES BASED ON PEAK TIMEFRAMES THROUGHOUT THE DAY |

| PAYMENT PROCESSOR | STATUS LOCATION | STATUS CODE | STATUS TIME |
|---|---|---|---|
| PAYMENT PROCESSOR A | CONNECTIVITY STATUS | 300 | 14:23:45 |
|  |  | 300 | 14:24:56 |
|  |  | 302 | 04:25:32 |
|  | PROCESSOR STATUS | 302 | 06:11:43 |
|  |  | 400 | 01:13:33 |
|  |  | 400 | 01:17:35 |
| PAYMENT PROCESSOR B | CONNECTIVITY STATUS | 300 | 16:23:45 |
|  |  | 301 | 16:24:12 |
|  | PROCESSOR STATUS | 400 | 02:13:13 |
|  |  | 402 | 04:12:11 |
|  |  | 402 | 04:12:45 |
|  |  | 404 | 01:56:25 |
| ⋮ | ⋮ | ⋮ | ⋮ |

*FIG. 5*

| PAYMENT PROCESSOR 610 | REQUEST TIME 620 | RESPONSE TIME 630 |
|---|---|---|
| PAYMENT PROCESSOR A | 14:23:43 | 14:23:45 |
| | 14:24:12 | 14:24:14 |
| | 14:28:33 | 14:28:34 |
| PAYMENT PROCESSOR B | 14:23:46 | 14:23:51 |
| | 14:23:55 | 14:24:03 |
| | 14:24:05 | 14:24:13 |
| ... | ... | ... |

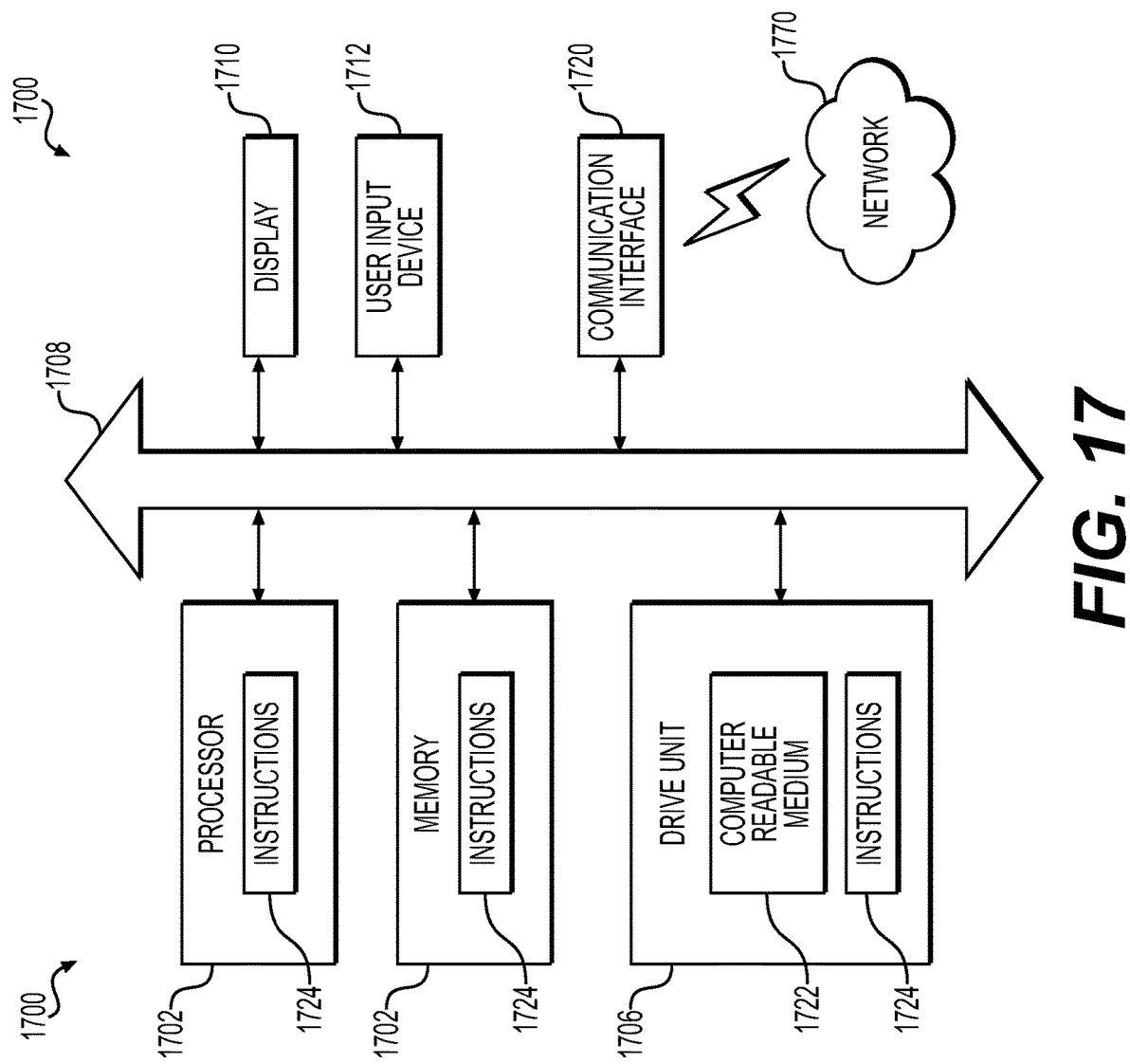

METHODS AND SYSTEMS FOR DYNAMIC ROUTING OF ELECTRONIC TRANSACTION MESSAGES WHILE MAINTAINING TOKEN COMPATIBILITY

TECHNICAL FIELD

The present disclosure relates to methods and systems for electronic transaction processing. More particularly, the technologies described herein relate to the field of electronic transaction message routing.

BACKGROUND

As demand for software-based electronic payment processing services continues to increase, consumers (e.g., merchants) have become more sensitive to availability, redundancy, and scalability of those services. For instance, consumers may want to utilize services provided from a variety of transaction platforms (e.g., acquirers, payment processors, etc.), without the hassle of manually updating their systems for compliance and compatibility. Further, when a transaction platform becomes unresponsive or unreachable, consumers may want to access other transaction platforms that are operating properly without further delay. Furthermore, consumers may want to utilize a transaction platform that is most responsive and/or error-free among a multitude of available transaction platforms.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

One embodiment provides a computer-implemented method for dynamic routing of electronic transaction messages while maintaining token compatibility, comprising: receiving a request message from a merchant system; determining a final destination payment processor based on a routing directive associated with the request message; updating the request message based on the final destination payment processor, the updating comprising: updating a message destination to the final destination payment processor; and replacing an initial token with a token that is compatible with the final destination payment processor; and transmitting the updated request message to a downstream entity.

One embodiment provides a system for dynamic routing of electronic transaction messages while maintaining token compatibility. The system may comprise at least one processor; and at least one data storage comprising instructions which, when executed by the at least one processor, cause the at least one processor to perform a method comprising: receiving a request message from a merchant system; determining a final destination payment processor based on a routing directive associated with the request message; updating the request message based on the final destination payment processor, the updating comprising: updating a message destination to the final destination payment processor; and replacing an initial token with a token that is compatible with the final destination payment processor; and transmitting the updated request message to a downstream entity.

One embodiment provides a non-transitory computer readable medium for dynamic routing of electronic transaction messages while maintaining token compatibility. The non-transitory computer readable medium may comprise instructions which, when executed by at least one processor, cause the at least one processor to perform a method comprising: receiving a request message from a merchant system; determining a final destination payment processor based on a routing directive associated with the request message; updating the request message based on the final destination payment processor, the updating comprising: updating a message destination to the final destination payment processor; and replacing an initial token with a token that is compatible with the final destination payment processor; and transmitting the updated request message to a downstream entity.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 3 shows a block diagram illustrating the types of data stored in a database of a DRS system, according to one aspect of the present disclosure.

FIG. 4 depicts exemplary routing directives that may be configured via a portal of a DRS system, according to one aspect of the present disclosure.

FIG. 5 depicts exemplary contextual data that may be stored in a database of a DRS system, according to one aspect of the present disclosure.

FIG. 6 depicts another exemplary contextual data that may be stored in a database of a DRS system, according to one aspect of the present disclosure.

FIG. 17 illustrates an implementation of a computer system that may execute the techniques described herein.

DETAILED DESCRIPTION OF EMBODIMENTS

Figure 1:
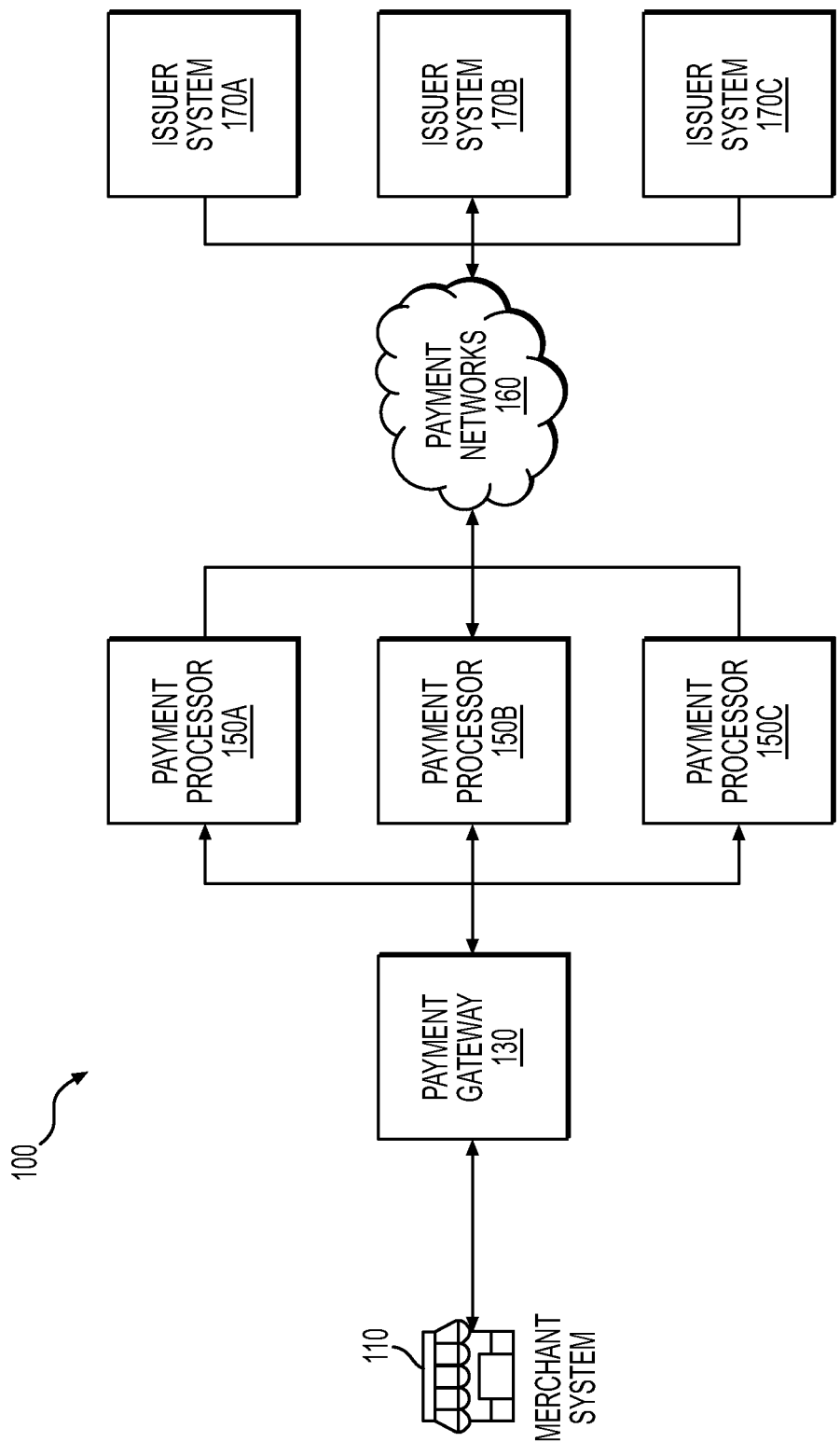
FIG. 1 depicts a block diagram of an exemplary payment system, according to one aspect of the present disclosure.

The following embodiments describe methods and systems for electronic transaction processing. More particularly, the technologies described herein relate to the field of electronic transaction message routing.

As demand for software-based electronic payment processing services continues to increase, consumers (i.e., clients such as, for example, merchants) have become more sensitive to availability, redundancy, and scalability of those services. To limit single points of failure, it may be prudent to evaluate calls for those services (i.e., request messages) to ensure there are multiple paths to successfully processing those calls, in the event that a processing or connection issue occurs with one or more services. To build this resiliency into interactions with transaction platforms, clients may need to create a specific logic configured to interpret failures and perform appropriate remedial actions. The remedial actions may comprise retrying the request against the same destination, modifying/updating the request to a different routing through the same destination, or trying the request against a different destination altogether.

To address the problems discussed above, dynamic routing service (DRS) system contemplated in the present disclosure may serve as a resiliency proxy service sitting between clients and transaction platforms they communicates with. The DRS system may alleviate the need for clients to programmatically build this logic themselves. Instead, clients may only need to configure desired remedial actions for differing conditions via a portal, and to point their respective endpoints (i.e., client systems such as, for example, merchant systems) to the DRS system.

The DRS system may be independent from both the clients and any transaction platforms they utilize, which may allow for hosting options to ensure that the DRS system can be reached successfully. The DRS system may be hosted in client data centers, in a cloud-based hosting service, or in other separate data centers. Further, the DRS system may be interface-agnostic (i.e., application programming interface (API)-agnostic, or platform-agnostic) as it may not be coded to specific interface specifications. Instead, the DRS system may be configuration-driven and may be able to determine which parts of request and response messages are significant and should be extracted.

The present disclosure also contemplates ways to maintain token compatibility while dynamic routing is being executed. Tokenization today is used as a method to provide data security for sensitive data. Tokenization is the process of protecting sensitive data by replacing it with an algorithmically generated number(s), which may be called a token. Thus, a token may comprise data or a value that maps back to sensitive data such as, e.g., a PAN, an expiration date for the token, an expiration date for the card, etc. For example, in a token, sensitive data may be replaced by a series of randomly-generated numbers. Through tokenization, a requesting client may be given non-sensitive reference data in exchange for the sensitive data elements. The reference data may be considered non-sensitive since the associated sensitive data may only be retrieved through security controls that authenticate and authorize the requestor. This allows clients to store non-sensitive reference data and to offload any sensitive data storage to tokenization providers, reducing auditing requirements as well as any potential sensitive data loss should a security incident occur. Therefore, a request message generated by a client (e.g., a merchant system) may comprise such a token as part of transaction data.

A request message that is received from a merchant system and routed by the DRS system to an appropriate transaction platform may comprise a token. However, if the transaction platform to which the request message is routed is configured for a token format that is different from that of the token included in the request message, the transaction platform and/or any downstream entity may not be able to process the request properly due to token incompatibility. To address this problem, the present disclosure also contemplates a token exchange service (TES) system that may be coupled to the DRS system. Specifically, the TES system may perform token exchanges through integration with each of supported token providers. In one embodiment, the TES system may enable detokenizing the token in the request message (i.e., input token) into sensitive data, and then retokenizing the sensitive data into an output token compatible with a receiving transaction platform. Via the TES system integration, a transaction platform may be able to process a request message that was initially intended for a different transaction platform by maintaining token compatibility. Further, a requesting client (e.g., DRS system or merchant system) may be out of scope of any sensitive data handling by moving those function and responsibility to the secure TES system environment.

Various non-limiting embodiments of the present disclosure will now be described to provide an overall understanding of the principles of the structure, function, and use of systems and methods disclosed herein for electronic transaction messaging conversion. One or more examples of these non-limiting embodiments are illustrated in the selected examples disclosed and described in detail with reference made to FIGS. 1-16 in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

The systems, apparatuses, devices, and methods disclosed herein are described in detail by way of examples and with reference to the figures. The examples discussed herein are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures, or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context. It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack. Those of ordinary skill in the art will recognize that the systems, apparatuses, devices, and methods described herein can be applied to, or easily modified for use with, other types of equipment, can use other arrangements of computing systems such as client-server distributed systems, and can use other protocols, or operate at other layers in communication protocol stacks, than are described.

For simplicity, the description that follows will be provided by reference to a "payment vehicle," which generally refers to any type of financial alternative to currency. As is to be clear to those skilled in the art, no aspect of the present disclosure is specifically limited to a specific type of payment vehicle. Therefore, it is intended that the following description encompasses the use of the present disclosure with many other forms of financial alternatives to currency, including credit cards, debit cards, smart cards, single-use cards, pre-paid cards, electronic currency (such as might be provided through a cellular telephone or personal digital assistant), and the like. Payment vehicles can be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, pre-paid or stored-value cards, or any other like financial transaction instrument. A payment vehicle can also have electronic functionality provided by a network of electronic circuitry that is printed or otherwise incorporated onto or within the payment vehicle (and typically referred to as a "smart card"), or be a fob having a transponder and an RFID reader.

Referring now to the appended drawings, FIG. 1 depicts a block diagram of an exemplary payment system, according to one aspect of the present disclosure. In the payment system 100, a consumer can utilize a payment vehicle to initiate a transaction at merchant system 110. A point-of-sale (POS) system (not shown) of merchant system 110 can communicate a request message (e.g., an authorization request message) to payment gateway 130, which may, in turn, communicate with one or more of payment processors 150A-150C. The POS system may be any system that facilitates receipt of a payment vehicle or enables card-not-present (CNP) workflows for payment of a purchase such as, for example, a POS terminal at a brick-and-mortar store, a web interface hosted by an electronic commerce (e-commerce) server, an application interface, etc. The request message may include various information, such as a merchant category code (MCC), a merchant identifier (MID), requested amount of funds to be authorized, payment vehicle information, cardholder identification information, and so forth. Payment processor 150A, 150B, or 150C that receives the request message may route the message through the appropriate payment network 160 to issuer system 170A, 170B, or 170C. Example payment network 160 may comprise the VISA, MASTERCARD, and AMERICAN EXPRESS payment network. Issuer system 170A, 170B, or 170C that receives the request message may determine whether to authorize the funds. A response to the request message (i.e., a response message) may then be provided through return communications to merchant system 110. Based on the response message, the transaction initiated by the consumer may be either approved or denied. It should be noted that, although only merchant system 110 is shown in FIG. 1, a plurality of merchant systems may be in communication with payment gateway 130 to process transactions initiated at their respective systems.

In general, the response message may comprise all or a portion of the information contained in the corresponding request message (e.g., MCC, MID, requested amount of funds to be authorized, payment vehicle information, cardholder identification information, etc.). The response message may further include an identifier representative of the payment processor that generated or is associated with the response message. In one embodiment, the request message and the corresponding response message may each comprise an identifier that uniquely identifies the pair of messages. The unique identifier may be generated by merchant system 110 when the request message is created, and may be included/appended in the request message. In some embodiments, the unique identifier may be generated further downstream, for example, by DRS system 220 which will be described below in reference to FIG. 2. The unique identifier may also be included in a response message corresponding to the request message. Therefore, in one embodiment, the unique identifier may be included in the response message by a payment processor that receives/processes the request message. In some embodiments, the unique identifier may be included in a response message by payment gateway 130, in case a connection with a payment processor cannot be established and the response message is instead generated by payment gateway 130, which will be explained in greater detail in reference to FIG. 11. The unique identifier may be used to keep track of the request and response messages within payment system 100 (and payment system 200 discussed below).

As explained above, when the consumer initiates a transaction at merchant system 110, the POS system (not shown) may be configured to transmit the request message to payment gateway 130. The payment gateway 130 may accept request messages from a variety of merchants and route the request messages to appropriate payment processors, such as one of payment processors 150A-150C. Payment gateway 130 may determine the destination payment processor based on the request message. For instance, a request message generated by a merchant system may comprise an indicator or identifier that is representative of a payment processor to which payment gateway 130 may route the request message. In one embodiment, the request message may be an application programming interface (API) call.

Transaction records may be stored in one or more locations within the system 100. In one embodiment, the transaction records may be stored within a transaction data databases of payment processors 150A-150C. The transaction data forming the transaction records may be received by the transaction data databases from various sources, such as merchant system 110, issuer systems 170A-170C, and so on. A plurality of transaction parameters associated with a purchase transaction may be stored in each transaction record which can generally be used for settlement and financial recordkeeping. While the transaction parameters stored in each transaction record can vary, example transaction parameters may include, without limitation, an account number, a card number, payment vehicle information, product information (such as product type, product serial number, and so forth), a transaction amount, loyalty account information, merchant information, a transaction amount, a response code, a transaction date, a transaction time, whether the transaction was a "card present" transaction, and so on.

Figure 2:
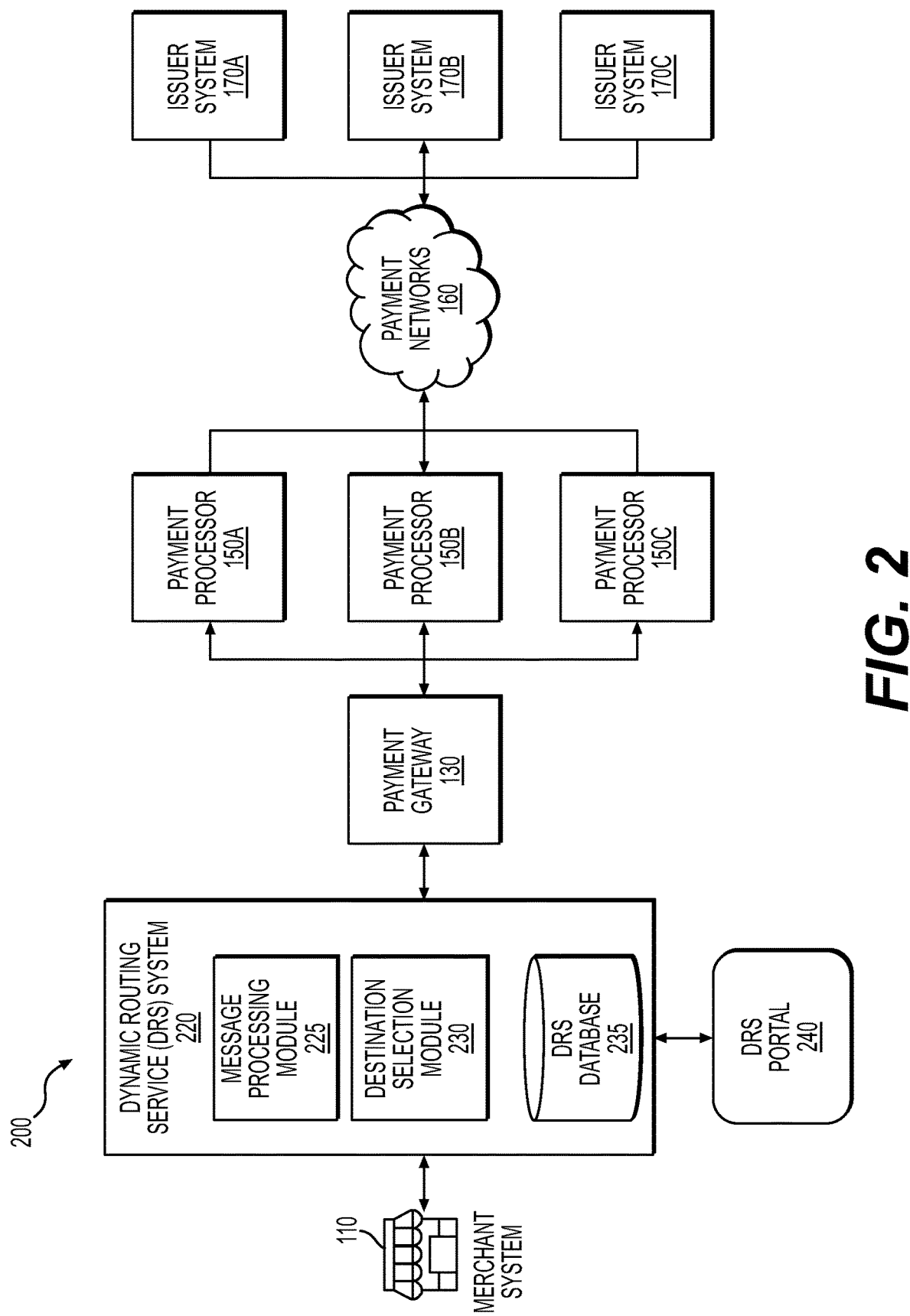
FIG. 2 depicts a block diagram of another exemplary payment system employing a dynamic routing service (DRS) system, according to one aspect of the present disclosure.

FIG. 2 depicts a block diagram of another exemplary payment system, according to one aspect of the present disclosure. Payment system 200 largely comprises the entities discussed above in reference to payment system 100 depicted in FIG. 1. However, in contrast to payment system 100, payment system 200 may include dynamic routing service (DRS) system 220 that improves processing speed and efficiency of electronic transactions via message routing. DRS system 220 may be situated between merchant system 110 and payment gateway 130. DRS system 220 may thus receive a request message that would have otherwise been directed to payment gateway 130, determine a payment processor to which the request message needs to be routed in accordance with a predefined routing directive, and update the request message (e.g., payload of the request message) to indicate the determined payment processor.

A request message generated by merchant system 110 may initially specify a payment processor to which the message is directed. Such a payment processor may be referred to as an initial destination payment processor. Once the request message is received at DRS system 220, in accordance with a routing directive, DRS system 220 may update the request message to specify a payment processor that is different from the initial destination processor. The payment processor that is specified in the updated request message via the routing step performed by DRS system 220 may be referred to as a final destination payment processor. In some embodiments, the final destination payment processor may be different from the initial destination payment processor. In other embodiments, the final destination payment processor may be the same as the initial destination payment processor. Updating the request message may comprise altering a message payload of the request message to designate the final destination payment processor as the message destination (i.e., update from the initial destination payment processor to the final destination payment processor).

DRS system 220 may comprise message processing module 225, destination selection module 230, and DRS database 235. Message processing module 225 may be configured to parse received messages (e.g., request message, response message, etc.) and determine message destinations as well as message origination points (e.g., a payment processor, a merchant system, etc.). Message processing module 225 may also be configured to parse received messages and determine status codes. A status code may comprise alphabetical, numerical, or alphanumerical characters and may represent a condition of an entity or a connection within the payment system 200, which will be described further in reference to FIGS. 4-5. Message processing module 225 may also be configured to determine a time of transmission of a message transmitted from the DRS system 220 to another entity, and a time of receipt of a message received by the DRS system 220 from another entity. Message processing module 225 may store all or a portion of the above data in DRS database 235. The data stored in the DRS database 235 may be used by destination selection module 230 to make a routing decision. Message processing module 225 may also send a portion of the above data directly to destination selection module 230 for further processing.

Destination selection module 230 may be configured to determine, based on data stored in DRS database 235 and/or data received from message processing module 225, a payment processor to which a received request message may be routed. In other words, destination selection module 230 may be configured to determine a final destination payment processor. Notably, destination selection module 230 may determine the final destination payment processor based on a routing directive associated with the request message.

Destination selection module 230 may find the routing directive based on certain data included in the request message such as, for example, merchant identifier (MID), merchant category code (MCC), requested amount of funds to be authorized, payment vehicle information, etc. In some embodiments, destination selection module 230 may use a status code, which may be included in a response message, to find the routing directive associated with a corresponding request message. If a routing directive associated with a request message is found, the request message is updated in accordance with the routing directive (e.g., indicating a final destination payment processor) prior to being transmitted to payment gateway 130. However, if a routing directive is not found, the request message may be transmitted to payment gateway 130 without being updated (e.g., indicating an initial destination payment processor). In some embodiments, a system-wide routing directive may be in place, meaning all request messages may be routed by DRS system 220 in accordance with the system-wide routing directive.

As explained above, DRS database 235 may store various data collected by message processing module 225. Additionally, DRS database 235 may store routing directives. FIG. 3 shows a block diagram illustrating the types of data stored in DRS database 235. The following discussion may refer to both FIG. 3 and FIG. 2. In general, DRS database 235 may store routing directives 310 and contextual data 320. Routing directives 310 may be provided by a user (e.g., a merchant, an administrator of DRS system 220, or any operator of DRS system 220) via DRS portal 240. DRS portal 240 may provide an interface and a plurality of graphical user interface (GUI) elements to enable a user to input routing configuration settings for request messages and specify characteristics of request messages to which routing directives may be applicable. As one example, a user may compose routing directives 310 for request messages originating from merchant system 110, utilizing the DRS portal 240. As explained above, in some embodiments, a user may be able to set a routing configuration setting for all request messages received at DRS system 220 (i.e., system-wide routing directive). In one embodiment, DRS portal 240 may be a web-based portal, so that the user may log in and create, modify, and/or remove one or more routing directives 310. In some embodiments, the user may specify a list of payment processors to which request messages from a merchant system may be routed (i.e., candidate destination payment processors), via DRS portal 240. Thus, a list of candidate destination payment processors specified for each merchant system may be stored in DRS database 235. The list of candidate destination payment processors may comprise all or a portion of payment processors in payment system 200. When determining a final destination payment processor for a request message, DRS system 220 may consider contextual data 320 associated with candidate destination payment processors and/or connections thereto in conjunction with an appropriate routing directive.

As explained above, contextual data 320 may comprise data collected by message processing module 225. In general, contextual data 320 may comprise any data that may describe conditions of components and connections thereto within payment system 200. Non-limiting examples of contextual data 320 may include request message origination points (e.g., merchant systems) and request message destinations (e.g., payment processors), times of transmission of request messages to payment gateway 130, response message origination points (e.g., payment processors and/or issuer systems) and response message destinations (e.g., merchant systems), times of receipt of response messages, status codes associated with payment processors and/or connections thereto, times associated with status codes, historical and current cost/fees associated with each payment processor, etc. In one embodiment, destination selection module 230 may determine a final destination payment processor for a request message based on contextual data associated with candidate destination payment processors. Contextual data 320 may also include parameters and corresponding values calculated based on the data mentioned above, such as response times of payment processors, average response times, error rates (e.g., number of errors per minute, hour, etc.) of processors and connections thereto, average error rates, etc.

FIG. 4 depicts exemplary routing directives that may be configured via DRS portal 240. It should be noted that routing directives that can be generated and processed by DRS system 220 are not limited to the routing directives specifically discussed in this section. DRS portal 240 may be configured to present a variety of routing parameters and/or values that the user may choose from during the process of configuring a routing directive. In one embodiment, such routing parameters may comprise one or more of a message type 410, a routing directive type 420, an error type (i.e., status code) 430, and destination selection criteria 440. In configuring a routing directive, the user may choose one or more routing parameters and their corresponding values in order to route a request message under a specific condition. It should be noted that the example routing directives as well as various parameter and values associated with such routing directives discussed herein are non-limiting. A routing directive may be configured in a dynamic manner, using a distinct combination of parameters and/or values discussed throughout the present disclosure.

Message type 410 may specify the type(s) of request messages to which the instant routing directive may be applicable. For instance, as shown in table 450, a message type 410 may specify that the routing directive may be applicable to request messages originating from a merchant system associated with a particular merchant identifier (MID). Another message type 410 may specify that the routing directive may be applicable to request messages originating from one or more merchant systems associated with a particular merchant category code (MCC). Further, a message type 410 may specify that the routing directive may be applicable to all request messages received at DRS system 220 (i.e., a system-wide routing directive). In some embodiments, routing directives may be assigned respective priority values/identifiers to indicate a preferred directive when more than one directive is applicable to a given request.

Routing directive type 420 may specify whether application of the routing directive may be error-based or not. An error-based routing directive may be applicable to a request message once the request message has been transmitted to an initial destination payment processor (by way of payment gateway 130) and an error message has been received in response. In other words, an error-based routing directive may be applicable if it is determined that the initial destination payment processor is currently unresponsive or unable to process the request message. On the other hand, a non-error-based routing directive may be applicable to a request message regardless of whether the initial destination payment processor is currently responsive or able to process the request message. In one embodiment, a non-error-based routing directive may be applied to a request message when the request message is received at DRS system 220, prior to transmission of the request message downstream and without having to determine the current status of the initial destination payment processor. Therefore, by using a non-error-based routing directive, a routing decision regarding certain request messages may be made promptly once those messages have been received at DRS system 220.

Error type or status code 430 may also be specified in the case of error-based routing directives. One or more status codes 430 may be specified for an error-based routing directive to limit application of the routing directive to instances of specific error type(s). As explained above, an error-based routing directive is applied to a request message once the request message has been transmitted to an initial destination payment processor and an error message has been returned. If the error-based routing directive includes one or more status codes, the routing directive may be applied to the request message only if the response message contains at least one of the one or more status codes. In table 450, status codes starting with the number 3 may indicate a connectivity error, and status codes starting with the number 4 may indicate a processor error. A connectivity error may comprise a failure to connect, a timeout, etc. A processor error may comprise an "unable to process" error (i.e., payment processor is unable to process the request message), a "service unavailable" error (i.e., a service associated with processing of the request message is unavailable at the payment processor), a "no answer" error (i.e., payment processor is unresponsive), etc. The numerical sequences representing various status codes in table 450 are exemplary only, and a status code may contain any numeric, alphabetical, or alphanumeric character sequence representative of an error type.

Destination selection criteria 440 may specify desired characteristics or status of a final destination payment processor to which the request message may be routed. Destination selection criteria 440 may also specify a time window for which the specified characteristics of the final destination payment processor may be analyzed. For example, destination selection criteria may specify that one or more error rates be less than a certain value and/or a response time (e.g., an average response time) be less than a certain value, within a specified time period. Destination selection criteria may also specify a transaction approval rate (e.g., authorized versus declined). Based on the destination selection criteria, a final destination payment processor may be selected from candidate payment processors. The characteristics specified in the destination selection criteria 440 may be determined based on contextual data stored in DRS database 235.

In some embodiments, destination selection criteria may instruct split routing among multiple payment processors, based on the characteristics of the candidate payment processors within a time window. For example, destination selection criteria may contain instructions to allocate and route varying amounts (i.e., percentages) of request messages to candidate payment processors that meet certain characteristics (e.g., error rates, response time, etc.). As another example, destination selection criteria may contain instructions to split routing among multiple candidate payment processors over time, based on peak timeframes determined for each of those payment processors. For instance, if contextual data show that a payment processor A receives a highest amount of messages or may be "busiest" around noon, and a payment processor B is less busy around the same time, DRS system 220 may route all messages (or a certain percentage of messages) around noon to payment processor B instead of payment processor A. Then, if payment processor B is experiencing a high volume of messages at another time and payment processor A is less busy, DRS system 220 may route all messages (or a certain percentage of messages) around that time to payment processor A instead of payment processor B. The split routing based on peak timeframes may also be percentage-based.

In addition to routing around peaks and valleys at candidate payment processors, split routing instructions may be based on anticipated transaction volumes of a merchant system. For example, if a merchant system is planning a limited promotion (e.g., a flash sale) and expects an usual amount of traffic during a specific time period, a routing directive that shifts routing into a split mode between multiple candidate payment processors may be applied during that time period. Further, more than one directive may be evaluated in making the routing decisions. For example, a split-routing directive may be fully or partially overridden if one or more of the candidate payment processors are exhibiting poor status/conditions. The evaluations may be facilitated by assigning priority identifiers/values to applicable routing directives, as discussed above.

Using split routing, the flow of request messages to payment processors may dynamically change depending on the status/conditions of the payment processors and connections thereto, reducing network bottlenecks and message processing time in payment system 200. Again, it should be noted that the examples discussed in this section are non-limiting. A split routing instruction may be configured in various ways, using the various parameters, characteristics, and/or conditions associated with payment processors discussed throughout the present disclosure.

In some embodiments, determining the final destination payment processor and/or the split routing schedule may comprise using a trained machine learning model. A machine learning model may be trained using contextual data stored in DRS database 235, and the final destination payment processor and/or the split routing schedule may be determined using the machine learning model. Any suitable machine learning technique that is now known or later developed may be used. In some embodiments, a final destination payment processor may be determined based on costs associated with candidate destination payment processors. The destination selection criteria may instruct that a payment processor associated with a least amount of cost be selected as the final destination payment processor. Alternatively, the destination selection criteria may instruct that payment processors associated with costs less than a certain amount be selected to perform split routing.

FIG. 5 depicts exemplary contextual data that may be stored in DRS database 235. Table 550 may store a status location 520 (e.g., connectivity, processor, etc.), a status code 530, a status time 540, etc. associated with a corresponding payment processor 510. The status location 520, status code 530, and status time 540 may be identified from a response message received from a payment processor via payment gateway 130. In other words, a response message received in response to a request message may include various parameters and values that describe the condition or status of the corresponding payment processor. Those parameters and values may be stored in DRS database 235 as contextual data, for example, as depicted in FIG. 5. Status location 520 may indicate the location of the condition/status reported via the response message such as, for example, processor or connectivity status. Status code 530 may be numeric, alphabetical, or alphanumeric character sequence representative of a condition or status reported via the response message. Status or conditions represented by status codes may include a failure to connect, timeout, unable to process, unavailable service, unresponsive processor, unstable connection, message processed successfully, connection success, etc. Status time 540 may represent the time that the condition/status was detected, identified, or logged.

FIG. 6 depicts another exemplary contextual data that may be stored in DRS database 236. Particularly, FIG. 6 illustrates how a response time (i.e., payment processor response time) may be determined from contextual data. For each request message directed to a payment processor 610, a time of transmission of the request message (i.e., request time 620) and a time of receipt of a response message corresponding to the request message (i.e., response time 630) may be recorded by DRS system 220. Based on these information, payment processor response times (i.e., response times) may be determined based on a time difference between the request time 620 and the response time 630. In some embodiments, peak timeframes of the payment processors may be also determined based on, for example, the number of request times and/or response times recorded for each of the payment processors in payment system 200. Alternatively, a peak timeframe of a payment processor may be determined based on identifying time periods during which the response times are longer than a threshold value (i.e., it may be take longer for the payment processor to process and respond to request messages due to a high volume of messages being routed to the payment processor during the identified time period).

Figure 7:
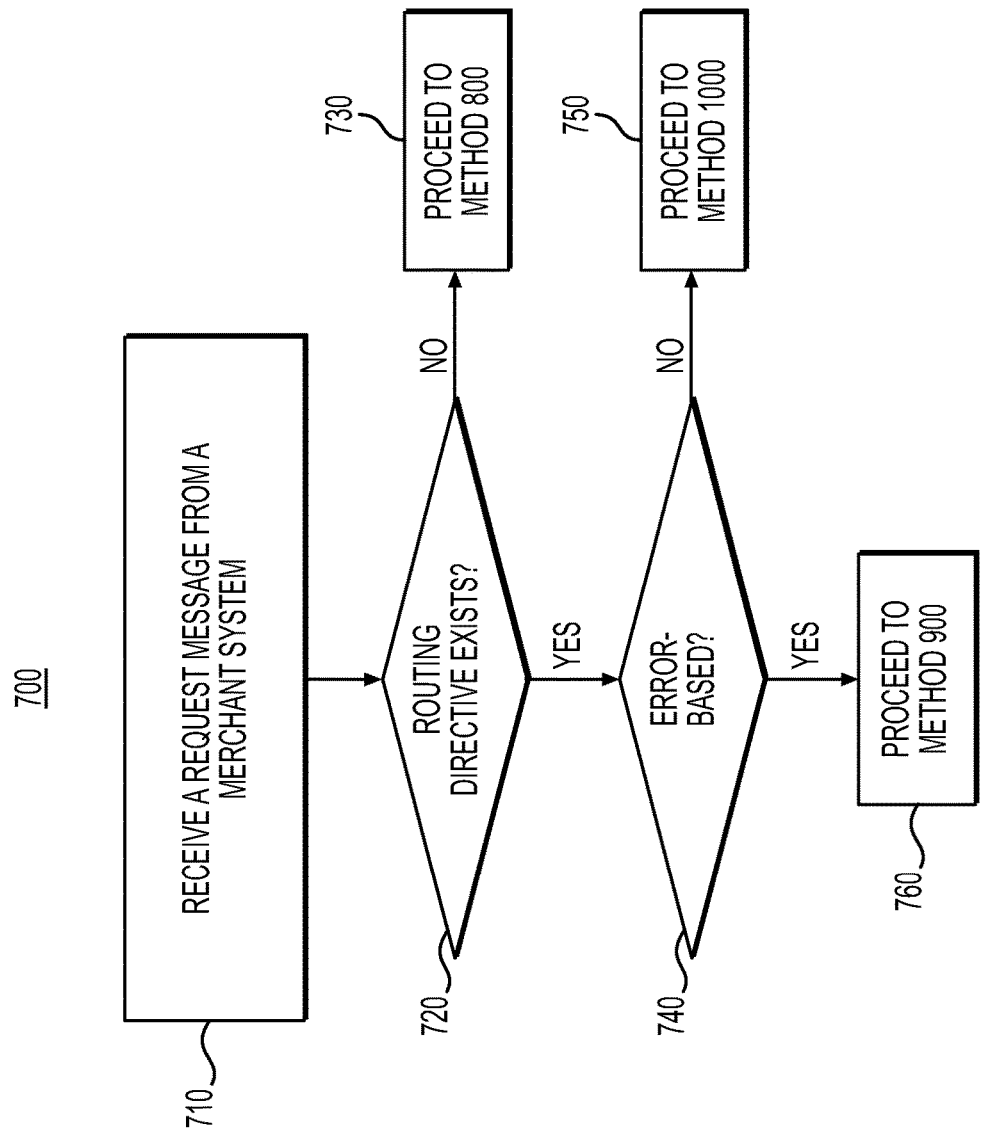
FIG. 7 depicts a flowchart of an exemplary method of receiving and categorizing a request message, according to one aspect of the present disclosure.

FIG. 7 depicts a flowchart of an exemplary method of receiving and categorizing a request message, according to one aspect of the present disclosure. In particular, method 700 may be performed by DRS system 220 (e.g., message processing module 225 thereof). As explained above, a request message may be associated with a routing directive, which may decide a final destination payment processor to which the request message may be directed. The application of the routing directive may be error-based or non-error-based. In other words, an error-based routing directive may be applied to a corresponding request message if the initial destination payment processor returns an error message (i.e., a status code indicating an error), and a non-error-based routing directive may be applied to a corresponding request message regardless of whether the initial destination payment processor is working or connected properly. Further, a request message may not be associated with any routing directive. In those circumstances, the request message may not be updated and may be routed to a corresponding initial destination payment processor. Method 700 may categorize a request message based on whether a routing directive exists, and if a routing directive exists, whether the routing directive is error-based or non-error-based.

At step 710, DRS system 220 may receive a request message from a merchant system. As explained above, the received request message may comprise transaction data, and may also include an identifier associated with an initial destination payment processor. At step 720, DRS system 220 may determine whether a routing directive associated with the request message exists in DRS database 235. As explained above, a routing directive associated with the request message may be found using one or more data included in the request message. If DRS system 220 determines that the routing directive does not exist, at step 730, method 700 may proceed to method 800 of FIG. 8. If DRS system 220 determines that the routing directive exists, at step 740, DRS system 220 may determine whether the routing directive is error-based or non-error-based. If DRS system 220 determines that the routing directive is non-error-based, at step 750, method 700 may proceed to method 1000 of FIG. 10. On the other hand, if DRS system 220 determines that the routing directive is error-based, at step 760, method 700 may proceed to method 900 of FIG. 9.

Figure 8:
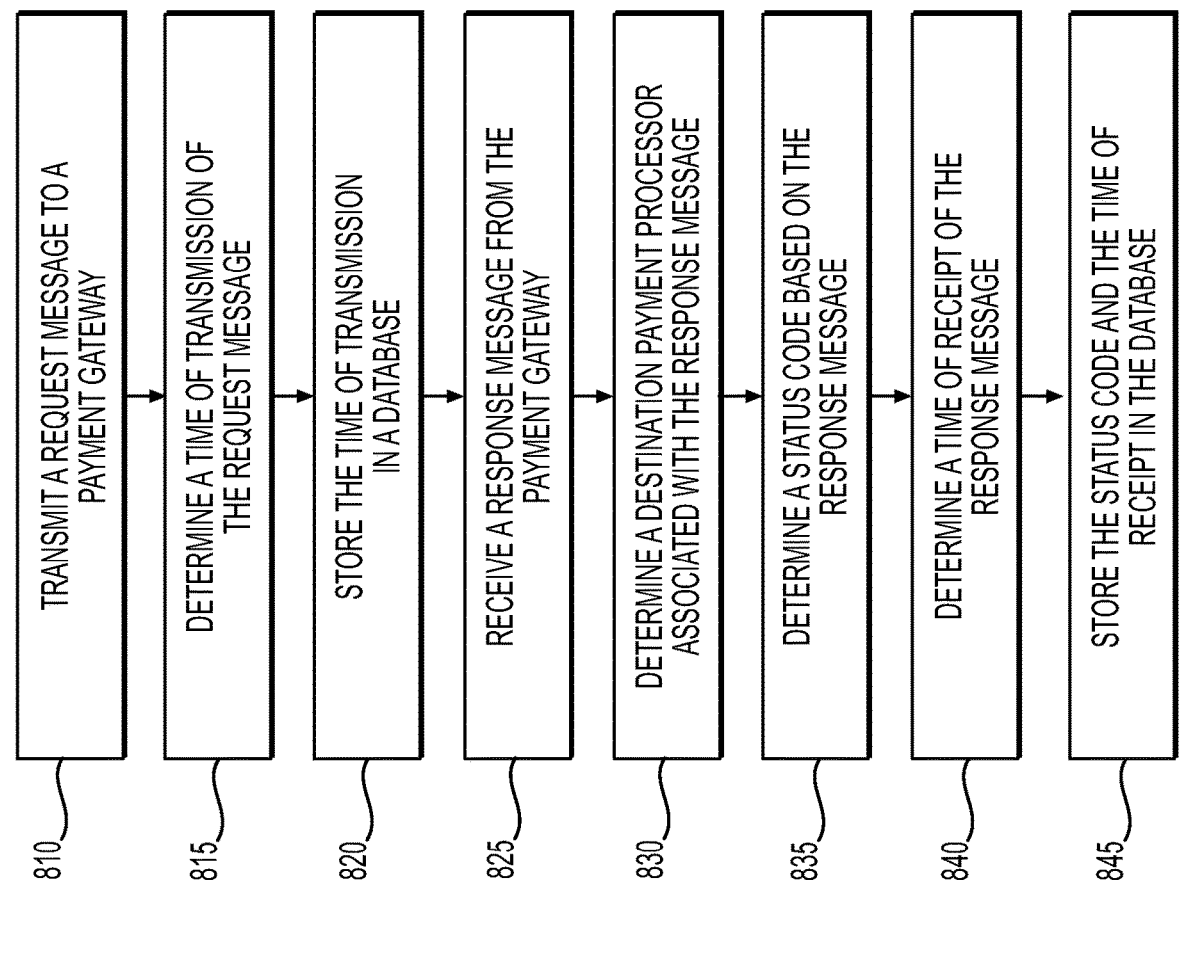
FIG. 8 depicts a flowchart of an exemplary method of routing a request message, according to one aspect of the present disclosure.

FIG. 8 depicts a flowchart of an exemplary method of routing a request message, according to one aspect of the present disclosure. Notably, method 800 may be performed by DRS system 220 (e.g., message processing module 225 and destination selection module 230 thereof) to route a request message that is not associated with any routing directive. Because the request message is not associated with any routing directive, the request message may be routed to an initial destination payment processor specified in the received request message. However, because DRS system 220 may retain and continue to collect status/performance data associated with payment processors 150A-150C and connections thereto within payment system 200, DRS system 220 may still record data related to the status and/or performance of the payment processors 150A-150C, such as a time of transmission of the request message downstream (i.e., to payment processors 150A-150C via payment gateway 130), a time of receipt of a response message, a status code in the response message, etc.

At step 810, DRS system 220 may transmit the request message to a payment gateway (e.g., payment gateway 130), without altering or updating the identifier associated with an initial destination payment processor included in the request message. At step 815, DRS system 220 (e.g., message processing module 225 thereof) may determine a time of transmission of the request message. At step 820, DRS system 220 (e.g., message processing module 225 thereof) may store the time of transmission in DRS database 235. At step 825, DRS system 220 (e.g., message processing module 225 thereof) may receive a response message from the payment gateway. At step 830, DRS system 220 (e.g., message processing module 225 thereof) may parse the response message and determine a destination payment processor associated with the response message. In other words, DRS system 220 may determine the payment processor from which the response message is received, or with which the response message is associated. At step 835, DRS system 220 (e.g., message processing module 225 thereof) may determine a status code based on the response message. In other words, DRS system 220 may retrieve the status code included in the response message. At step 840, DRS system 220 (e.g., message processing module 225 thereof) may determine a time of receipt of the response message. In some embodiments, DRS system 220 may also determine a time associated with the status code. For instance, if the status code is associated with an error, the time associated with the status code may represent the time that the error was detected in the destination payment processor or in the connection thereto. At step 845, the DRS system 220 (e.g., message processing module 225 thereof) may store the status code and the time of receipt (and the time associated with the status code) in DRS database 235. When evaluating contextual data to identify a final destination payment processor, DRS system 220 may consider the status codes along with the times of receipt. For example, DRS system 220 may consider these data to prevent routing to a very fast but also very error-prone payment processor.

Figure 9:
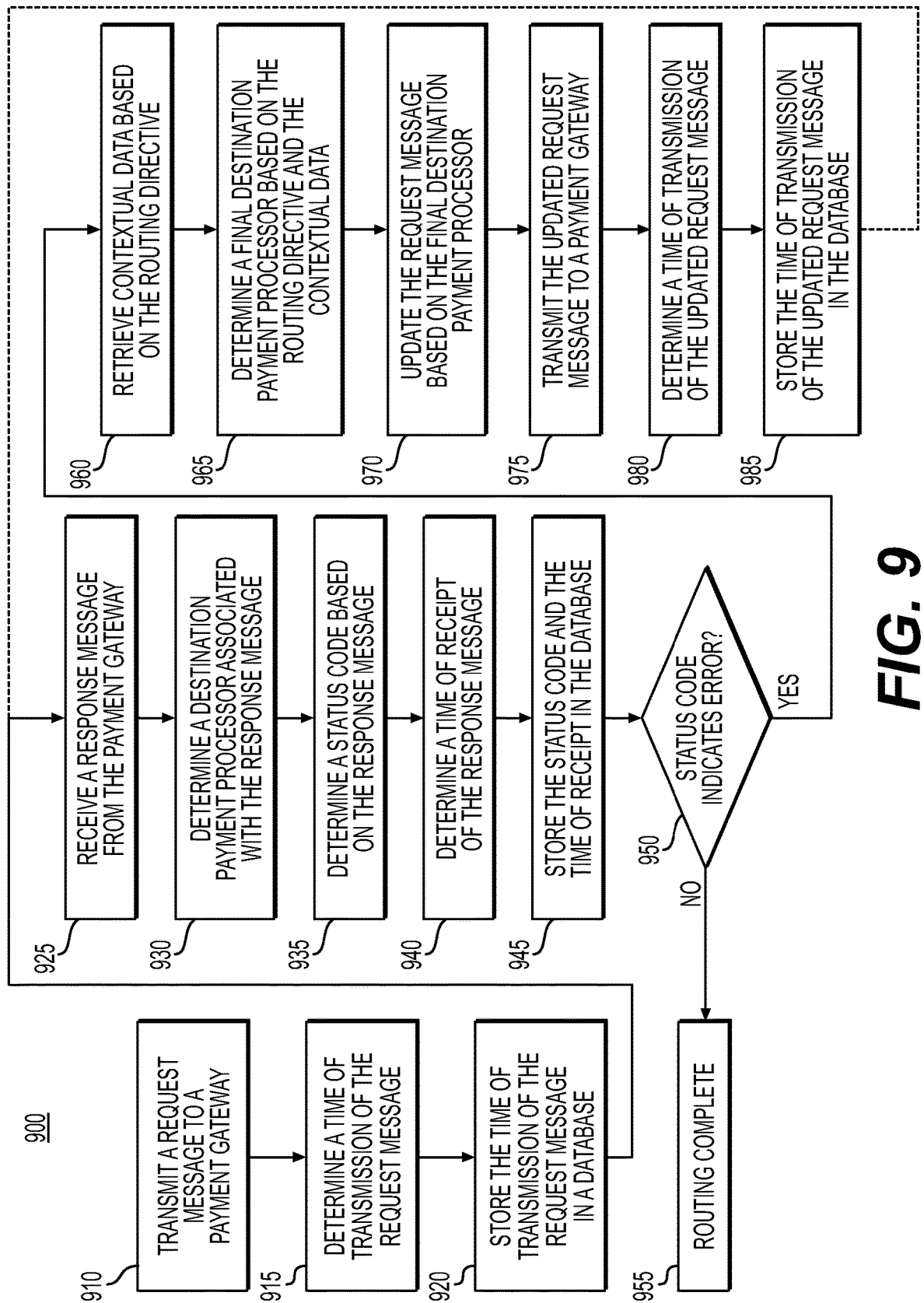
FIG. 9 depicts a flowchart of another exemplary method of routing a request message, according to one aspect of the present disclosure.

FIG. 9 depicts a flowchart of another exemplary method of routing a request message, according to one aspect of the present disclosure. Notably, method 900 may be performed by DRS system 220 (e.g., message processing module 225 and destination selection modules 230 thereof) to route a request message that is associated with an error-based routing directive. Because the request message is associated with an error-based routing directive, DRS system 220 may first determine whether the initial destination payment processor can be reached and/or can process the request message properly. Therefore, DRS system 220 may transmit (or attempt to transmit) the request message to the initial destination payment processor first, and may decide whether to re-route the request message to a final destination payment processor based on a response message received in association with the initial destination payment processor. If the response message received in association with the initial destination payment processor indicates an error (e.g., a connective error, a processor error, etc.), DRS system 220 may re-route the request message to a final destination payment processor determined based on the routing directive and relevant contextual data.

At step 910, DRS system 220 may transmit the request message to a payment gateway (e.g., payment gateway 130), without altering or updating the identifier associated with an initial destination payment processor included in the request message. At step 915, DRS system 220 (e.g., message processing module 225 thereof) may determine a time of transmission of the request message. At step 920, DRS system 220 (e.g., message processing module 225 thereof) may store the time of transmission in DRS database 235. At step 925, DRS system 220 (e.g., message processing module 225 thereof) may receive a response message from the payment gateway. At step 930, DRS system 220 (e.g., message processing module 225 thereof) may parse the response message and determine a destination payment processor associated with the response message. In other words, DRS system 220 may determine the payment processor from which the response message is received, or with which the response message is associated. At step 935, DRS system 220 (e.g., message processing module 225 thereof) may determine a status code based on the response message. In other words, DRS system 220 may retrieve the status code included in the response message. In some embodiments, DRS database 235 may retain a response mapping table. A response mapping table may map each status code to a corresponding normalized definition, such that status codes that indicate the same condition/status or are classified in the same category may be interpreted and treated uniformly. At step 940, DRS system 220 (e.g., message processing module 225 thereof) may determine a time of receipt of the response message. In some embodiments, DRS system 220 may also determine a time associated with the status code. For instance, if the status code is associated with an error, the time associated with the status code may represent the time that the error was detected in the destination payment processor or in the connection thereto. At step 945, the DRS system 220 (e.g., message processing module 225 thereof) may store the status code and the time of receipt (and the time associated with the status code) in DRS database 235.

At step 950, DRS system 220 (e.g., message processing module 225 thereof) may determine whether the status code indicates an error. If DRS system 220 determines that the status code does not indicate an error, method 900 may proceed to step 955 where the routing step is completed. In other words, because the routing directive is error-based and the initial destination payment processor did not return an error message (i.e., the initial destination payment processor was able to process the request message properly), the routing process associated with the request message is aborted without re-routing the request message to a final destination payment processor. On the other hand, if DRS system 220 determines that the status code indicates an error, method 900 may proceed to step 960 to initiate a re-routing procedure.

At step 960, DRS system 220 (e.g., destination selection module 230 thereof) may retrieve contextual data based on the routing directive. As explained above in reference to FIG. 4, a routing directive may comprise destination selection criteria specifying what types of contextual data need to be analyzed to decide a final destination payment processor. Thus, DRS system 220 may retrieve contextual data from DRS database 235 based on the destination selection criteria specified in the routing directive. At step 965, DRS system 220 (e.g., destination selection module 230 thereof) may determine a final destination payment processor based on the routing directive and the retrieved contextual data. As explained above, a final destination payment processor that satisfies the destination selection criteria may be selected. At step 970, DRS system 220 (e.g., message processing module 225 or destination selection module 230 thereof) may update the request message based on the final destination payment processor. In other words, DRS system 220 may update the identifier associated with the initial destination payment processor to an identifier associated with the final destination payment processor. In some embodiments, transaction data included in the request message may also be updated. Specifically, a token included in the request message may be updated, or replaced with another token, based on the determined final destination payment processor. Such a token exchange process will be described in greater detail below in reference to FIGS. 12-16. At step 975, DRS system 220 (e.g., message processing module 225 thereof) may transmit the updated request message to the payment gateway. At step 980, DRS system 220 (e.g., message processing module 225 thereof) may determine a time of transmission of the updated request message. At step 985, DRS system 220 (e.g., message processing module 225 thereof) may store the time of transmission of the updated request message in DRS database 235.

Upon transmitting the updated request message and storing the time of transmission, DRS system 220 may further receive a response message from the payment gateway, the response message corresponding to the updated request message. Therefore, as indicated by the dotted line in FIG. 9, method 900 may loop back to step 925 after step 985, in order to determine whether the updated request message has been successfully processed by the final destination payment processor. If the updated request message has been successfully processed, further re-routing may not be necessary and method 900 may thus be aborted. If the updated request message has not been successfully processed (i.e., if the final destination payment processor returns an error message), the request message may be further re-routed after determining another final destination payment processor. More detailed discussion will follow in the sections below.

At step 925, DRS system 220 (e.g., message processing module 225 thereof) may receive a response message from the payment gateway. Notably, the response message may be in response to the updated request message transmitted at step 975. At step 930, DRS system 220 (e.g., message processing module 225 thereof) may determine a destination payment processor associated with the response message (i.e., the final destination payment processor to which the updated request was transmitted at step 975). At step 935, DRS system 220 (e.g., message processing module 225 thereof) may determine a status coded included in the response message. At step 940, DRS system 220 (e.g., message processing module 225 thereof) may determine a time of receipt of the response message. As discussed above, DRS system 220 may also determine a time associated with the status code (i.e., a time at which the condition indicated by the status code was determined). At step 945, DRS system 220 (e.g., message processing module 225 thereof) may store the status code and the time of receipt (and the time associated with the status code) in DRS database 235. At step 950, DRS system 220 (e.g., message processing module 225 thereof) may determine whether the status code indicates an error. If the status code does not indicate an error, method 900 may proceed to step 955 where the routing step is completed. In other words, because the final destination payment processor did not return an error message (i.e., the final destination payment processor was able to process the updated request message properly), the routing process associated with the updated request message may be aborted without re-updating and re-routing the request message to another final destination payment processor. On the other hand, if DRS system 220 determines that the status code indicates an error, method 900 may proceed to step 960 to initiate another re-routing procedure. In FIG. 9, steps 960-985 and then steps 925-950 may be performed iteratively until the request message is processed successfully by a final destination payment processor. In some embodiments however, steps 960-985 may be performed only once and, even if a response message corresponding to an updated request message indicates an error (i.e., a response message from a final destination payment processor indicates an error), re-updating and re-routing of the request message to another final destination payment processor may not be performed. In such a case, the status code indicating the error may be recorded in DRS database 235 (along with the time of receipt of the response message and/or the time of error), and a notification or message may be sent to merchant system 110, indicating that the request message could not be processed and/or resulted in an error.

Figure 10:
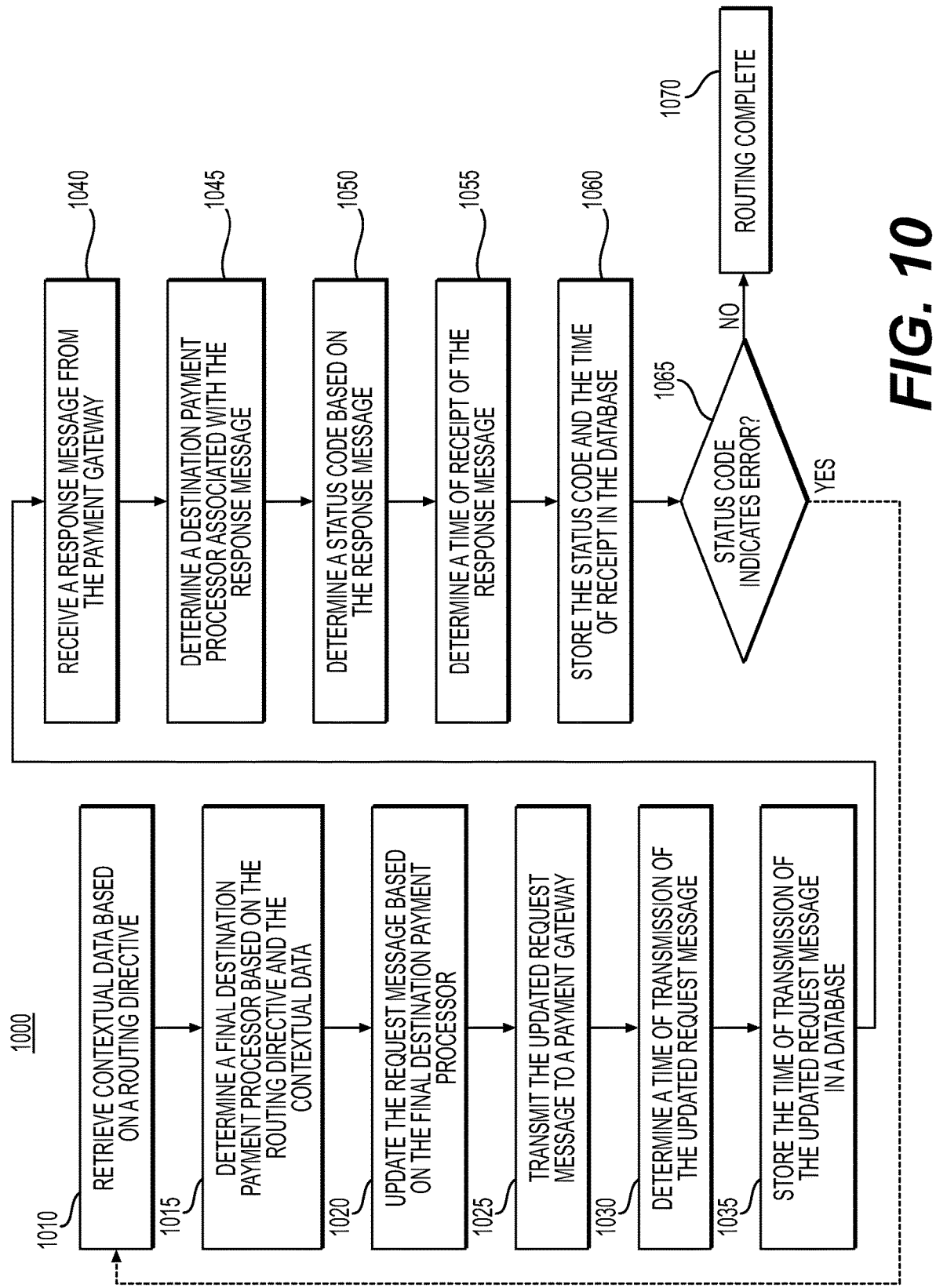
FIG. 10 depicts a flowchart of yet another exemplary method of routing a request message, according to one aspect of the present disclosure.

FIG. 10 depicts a flowchart of yet another exemplary method of routing a request message, according to one aspect of the present disclosure. Notably, method 1000 may be performed by DRS system 220 (e.g., message processing module 225 and destination selection modules 230 thereof) to route a request message that is associated with a non-error-based routing directive. Because the request message is associated with a non-error-based routing directive, DRS system 220 may determine a final destination payment processor in accordance with a determined routing directive without first routing the request message to an initial destination payment processor (i.e., regardless of whether the initial destination payment processor can be reached and can process the request message properly).

At step 1010, DRS system 220 (e.g., destination selection module 230 thereof) may retrieve contextual data based on a routing directive. As explained above in reference to FIG. 4, a routing directive may comprise destination selection criteria specifying what types of contextual data need to be analyzed to decide a final destination payment processor. Thus, DRS system 220 may retrieve contextual data from DRS database 235 based on the destination selection criteria specified in the routing directive. At step 1015, DRS system 220 (e.g., destination selection module 230 thereof) may determine a final destination payment processor based on the routing directive and the retrieved contextual data. As explained above, a final destination payment processor that satisfies the destination selection criteria may be selected. At step 1020, DRS system 220 (e.g., message processing module 225 or destination selection module 230 thereof) may update the request message based on the final destination payment processor. In other words, DRS system 220 may update the identifier associated with the initial destination payment processor to an identifier associated with the final destination payment processor. In some embodiments, transaction data included in the request message may also be updated. Specifically, a token included in the request message may be updated, or replaced with another token, based on the determined final destination payment processor. Such a token exchange process will be described in greater detail below in reference to FIGS. 12-16. At step 1025, DRS system 220 (e.g., message processing module 225 thereof) may transmit the updated request message to a payment gateway. At step 1030, DRS system 220 (e.g., message processing module 225 thereof) may determine a time of transmission of the updated request message. At step 1035, DRS system 220 (e.g., message processing module 225 thereof) may store the time of transmission of the updated request message in DRS database 235.

At step 1040, DRS system 220 (e.g., message processing module 225 thereof) may receive a response message from the payment gateway. Notably, the response message may be in response to the updated request message transmitted at step 1035. At step 1045, DRS system 220 (e.g., message processing module 225 thereof) may determine a destination payment processor associated with the response message (i.e., the final destination payment processor to which the updated request was transmitted at step 1025). At step 1050, DRS system 220 (e.g., message processing module 225 thereof) may determine a status coded included in the response message. At step 1055, DRS system 220 (e.g., message processing module 225 thereof) may determine a time of receipt of the response message. As discussed above, DRS system 220 may also determine a time associated with the status code (i.e., a time at which the condition indicated by the status code was determined). At step 1060, DRS system 220 (e.g., message processing module 225 thereof) may store the status code and the time of receipt (and the time associated with the status code) in DRS database 235. At step 1065, DRS system 220 (e.g., message processing module 225 thereof) may determine whether the status code indicates an error. If the status code does not indicate an error, method 1000 may proceed to step 1070 where the routing step is completed. In other words, because the final destination payment processor did not return an error message (i.e., the final destination payment processor was able to process the updated request message properly), the routing process associated with the updated request message may be aborted without re-updating and re-routing the request message to another final destination payment processor. On the other hand, if DRS system 220 determines that the status code indicates an error, method 1000 may loop back to step 1010 to initiate another re-routing procedure. In FIG. 10, steps 1010-1065 may be performed iteratively until the request message is processed successfully by a final destination payment processor. In some embodiments however, steps 1010-1065 may be performed only once and, even if a response message corresponding to an updated request message indicates an error (i.e., a response message from a final destination payment processor indicates an error), re-updating and re-routing of the request message to another final destination payment processor may not be performed. In such a case, a notification or message may be sent to merchant system 110, indicating that the request message could not be processed and/or resulted in an error.

Figure 11:
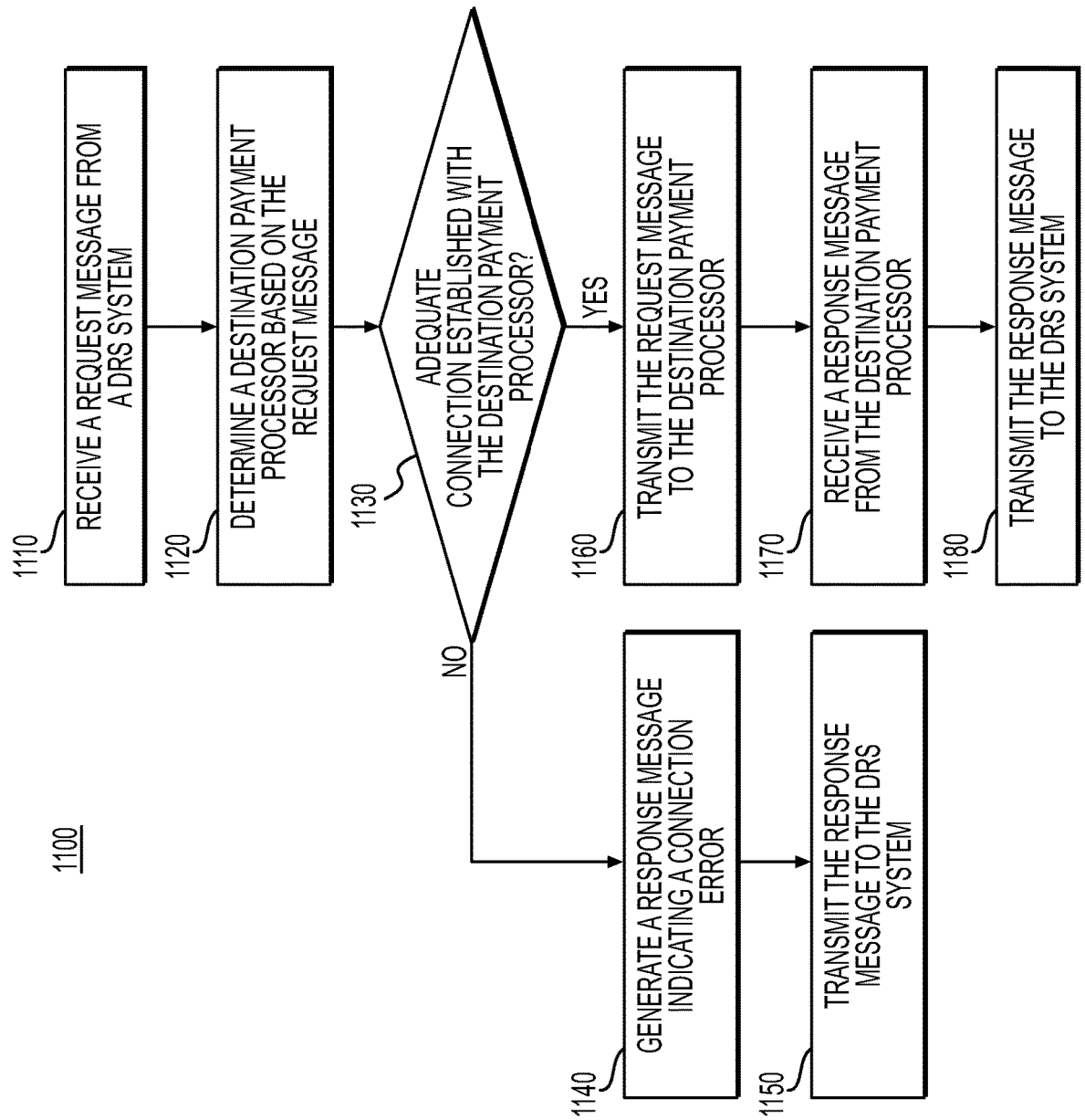
FIG. 11 depicts a flowchart of an exemplary method of routing a request message received from a DRS system at a payment gateway, according to one aspect of the present disclosure.

FIG. 11 depicts a flowchart of an exemplary method of routing a request message received from DRS system 220, according to one aspect of the present disclosure. Notably, method 1100 may be performed by payment gateway 130 to route a request message to an appropriate payment processor indicated in the request message. The request message received from DRS system 220 at payment gateway 130 may indicate i) an initial destination payment processor if the request message was not updated at DRS system 220, or ii) a final destination payment processor if the request message was updated at DRS system 220. As explained above, the final destination payment processor may be the same or different from the initial destination payment processor that was initially indicated in the request message.

At step 1110, payment gateway 130 may receive a request message from DRS system 220. At step 1120, payment gateway 130 may determine a destination payment processor (i.e., initial destination payment processor or final destination payment processor) indicated in the request message. In one embodiment, the destination payment processor may be indicated with an identifier. At step 1130, payment gateway 130 may determine whether an adequate connection can be established with the destination payment processor. In one embodiment, payment gateway 130 may check whether the destination payment processor can be reached via, for example, handshaking or other suitable methodology. In some embodiments, payment gateway 130 may send a test message to the destination payment processor and check whether a test response message is received within a predefined time (i.e., set a timeout). If the test response message is not received within the predefined time, payment gateway 130 may conclude that an adequate connection cannot be established with the destination payment processor.

If it is determined that an adequate connection cannot be established with the destination payment processor at step 1130, method 1100 may proceed to step 1140. At step 1140, payment gateway 130 may generate a response message indicating a connection error (e.g., connection failure, timeout, etc.). To that end, the response message may comprise a status code representative of the connection error. At step 1150, payment gateway 130 may transmit the response message to DRS system 220.

If it is determined that an adequate connection can be established with the destination payment processor at step 1130, method 1100 may proceed to step 1160. At step 1160, payment gateway 130 may transmit the request message to the destination payment processor. At step 1170, payment gateway 130 may receive a response message from the destination payment processor.

In an alternate embodiment, payment gateway 130 may transmit the request message to the destination payment processor (step 1160), without performing step 1130. In other words, payment gateway 130 may not perform step 1130, and may transition from step 1120 to step 1160. In such a case, a connectivity problem may be detected if payment gateway 130 does not receive a response message from the destination payment processor within a predefined time. If a connectivity problem is detected, method 100 may proceed to step 1140. If a connectivity problem is not detected, method 100 may proceed to step 1170.

As explained above, a response message received from a destination payment processor may comprise a status code representative of a status or condition of the destination payment processor (e.g., processing error, processing success, etc.). At 1180, payment gateway 130 may transmit the response message to DRS system 220.

Figure 12:
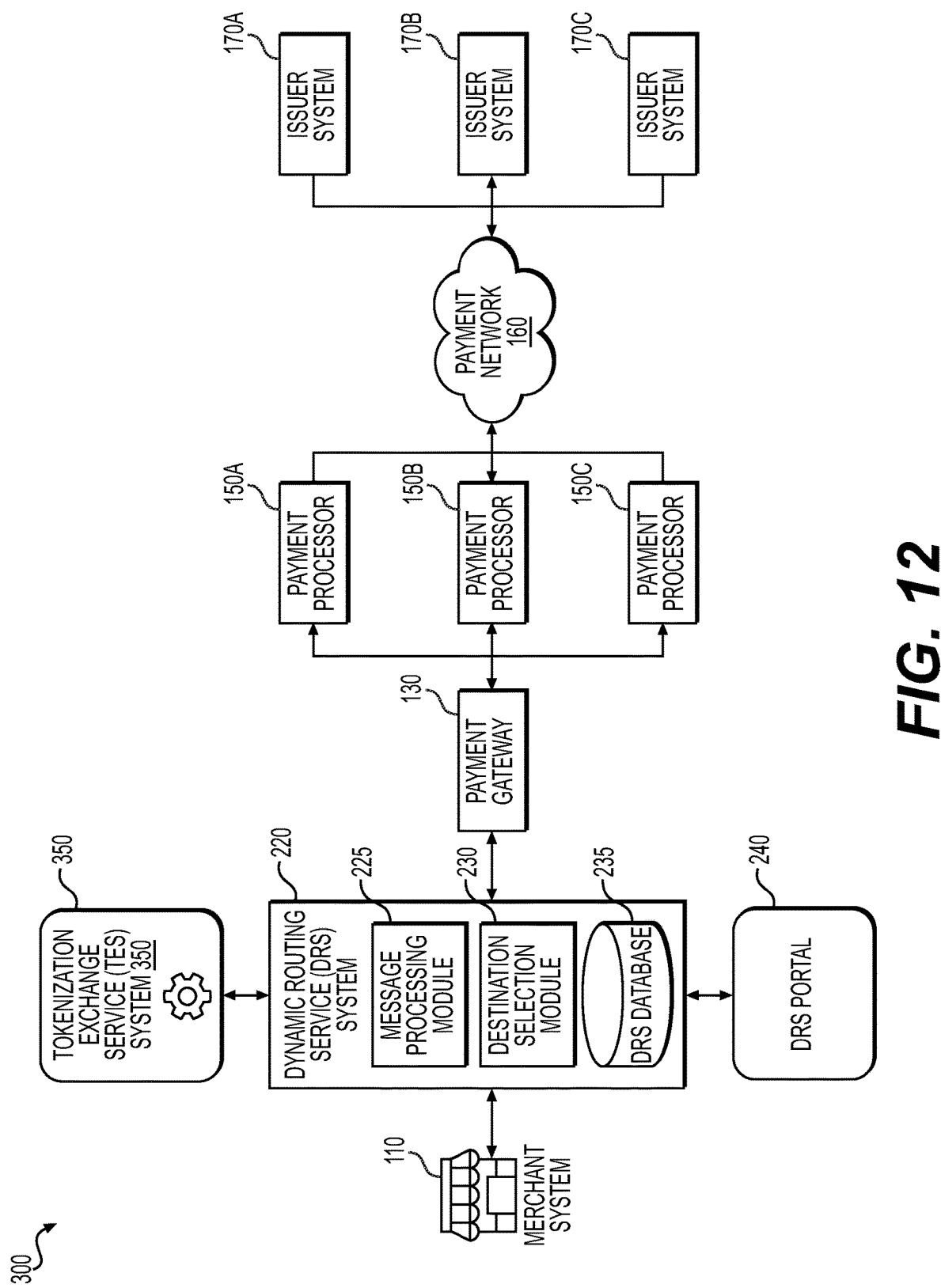
FIG. 12 depicts a block diagram of another exemplary payment system employing a DRS system and a tokenization exchange service (TES) system, according to one aspect of the present disclosure.

FIG. 12 depicts a block diagram of another exemplary payment system, according to one aspect of the present disclosure. Payment system 300 largely comprises the entities discussed above in reference to payment system 200 depicted in FIG. 2. Additionally, payment system 300 may include tokenization exchange service (TES) system 350. TES system 350 may be in communication with DRS system 220 via a network as shown in FIG. 12. In some embodiments, TES system 350 may be implemented within DRS system 220, rather than being in communication with DRS system 220 via a network.

As explained above, a request message that is received from merchant system 110 and routed by DRS system 220 to an appropriate payment processor (e.g., one of payment processors 150A-150C) may comprise a token. However, if the payment processor to which the request message is routed is configured for a token format that is different from that of the token initially included in the request message, the payment processor and/or any downstream entity may not be able to process the request properly due to token incompatibility. Although DRS system 220 may be configured to route a request message to a final destination payment processor for more prompt and/or error-free message processing, the request message might only include a token that is compatible with an initial destination payment processor (i.e., payment processor that was indicated in the request message when the request message was initially received from merchant system 110) but incompatible with the final destination payment processor. To address this problem, DRS system 220 may communicate with TES system 350, which may be configured to perform token exchanges through integration with supported token providers. In one embodiment, TES system 350 may enable detokenizing the token in the request message (i.e., input token) into sensitive data, and then retokenizing the sensitive data into an output token compatible with the final destination payment processor. In some embodiments, if the final destination payment processor does not support tokens, TES system 350 may enable detokenizing the token in the request message (i.e., input token) into sensitive data, and then securely transmitting the sensitive data to the final destination payment processor without retokenizing.

Figure 13:
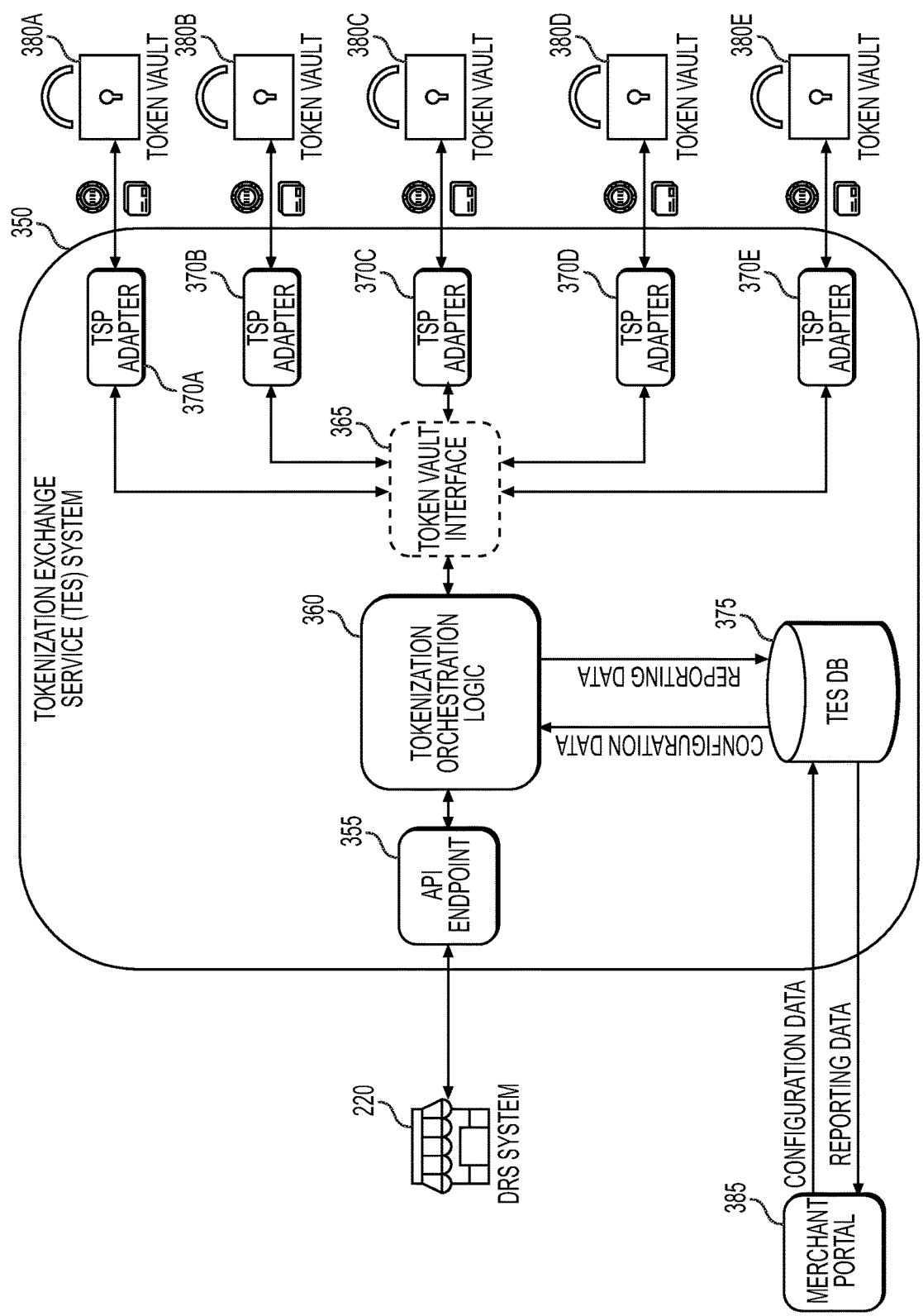
FIG. 13 is a schematic block diagram illustrating various components of an exemplary TES system, according to one aspect of the present disclosure.

FIG. 13 is a schematic block diagram illustrating various components of an exemplary tokenization exchange service (TES) system, according to one aspect of the present disclosure. In general, TES system 350 may comprise an application programming interface (API) endpoint 355, a tokenization orchestration logic 360, a TES database 375, a token vault interface 365, and token service provider (TSP) adapters 370A-370E. TES system 350 may be in communication with DRS system 220 and one or more token vaults 380A-380E. Further, the TES system 350 may provide a merchant portal 385. The individual components associated with TES system 350 will now be discussed in greater detail.

As explained above, while it may be beneficial for merchant system 110 to process transactions utilizing various types of payment processors, merchant system 110 may only have tokens that are compatible with a particular payment processor, or a limited set of payment processors. Therefore, a request message generated by merchant system 110 may comprise a token that might not be compatible with a payment processor to which the request message is ultimately routed (i.e., a final destination payment processor) by DRS system 220. To solve or mitigate this problem, DRS system 220 may operate in conjunction with TES system 350.

For merchant system 110, one or more authentication identities may be created and given different authorization permissions such as, e.g., tokenize, detokenize, token swap, etc. These high-level permissions may apply across all token service provider configuration instances for the merchant. For merchant system 110 therefore, multiple token service provider configuration instances may be created. A configuration instance may define provider-specific configuration items, such as, e.g., uniform resource locator (URL), certificate, user name and password, etc. As will be discussed in the following sections, the configuration instances may be provided to and used by TES system 350 to generate instructions/requests to various token vaults 380A-380E. Because DRS system 220, in lieu of merchant system 110, may submit token-related requests to TES system 350, DRS system 220 may also retain multiple token service provider configuration instances associated with merchant system 110.

Figure 14:
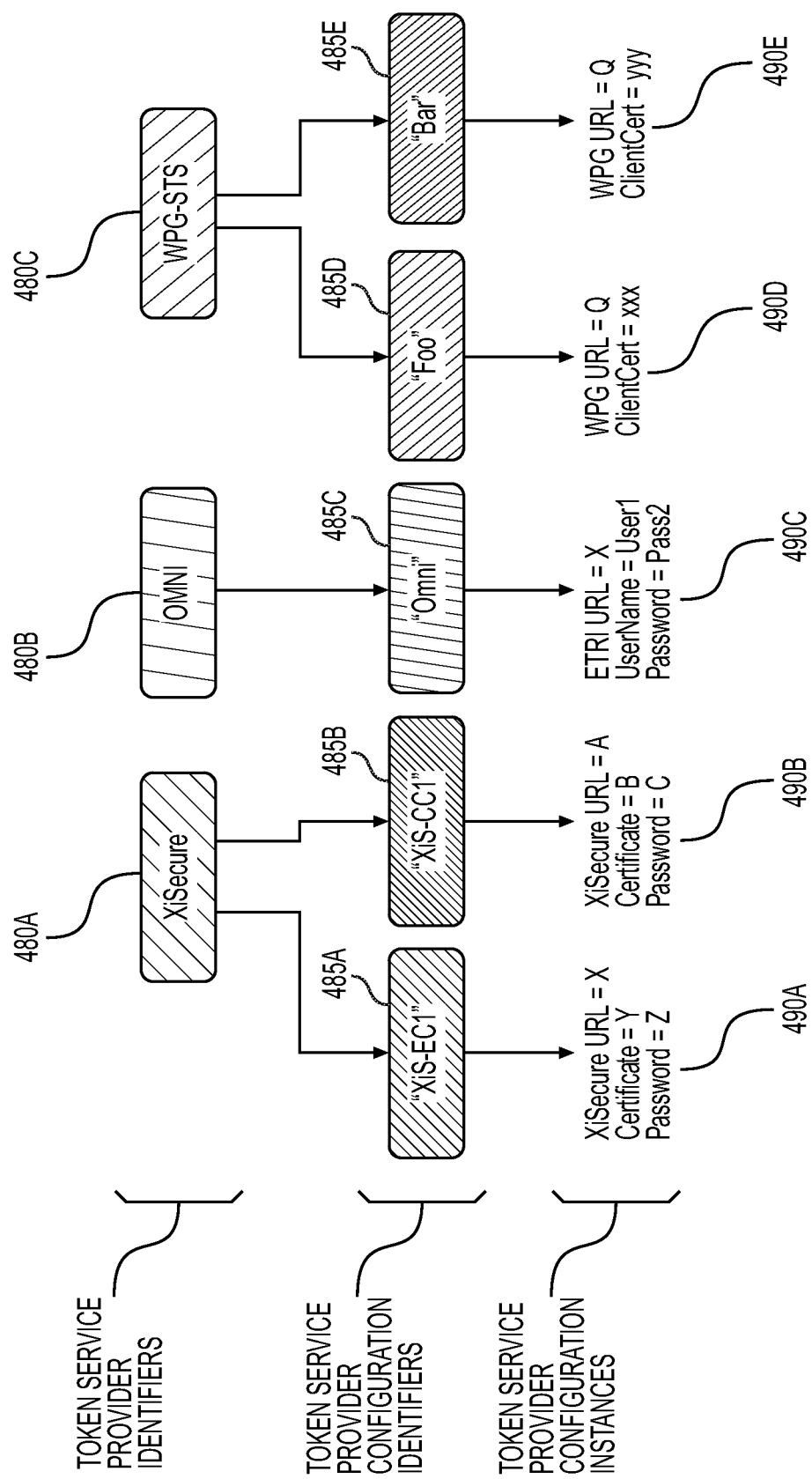
FIG. 14 shows a block diagram illustrating token service provider configuration instances created for a merchant system, according to one aspect of the present disclosure.

FIG. 14 shows a block diagram illustrating token service provider configuration instances created for a merchant system (e.g., merchant system 110), according to one aspect of the present disclosure. Merchant system 110 may store one or more token service provider identifiers corresponding to token service providers (or token service provider types) that may provide a token exchange service for merchant system 110 via TES system 350. In FIG. 14, merchant system 110 is associated with three token service providers identified as XiSecure 480A, OMNI 480B, and WPG-STS 480C. Each token service provider may be associated with one or more configuration instances, and each configuration instance may be assigned an identifying name, or a configuration identifier that is unique within the scope of merchant system 110. For example, the token service provider XiSecure 480A may be associated with configuration instances 490A and 490B, which are assigned configuration identifiers XiS-EC1 485A and XiS-CC1 485B, respectively. The token service provider OMNI 480B may be associated with configuration instance 490C, which is assigned a configuration identifier Omni 485C. The token service provider WPG-STS 480C may be associated with configuration instances 490D and 490E, which are assigned configuration identifiers Foo 485D and Bar 485E, respectively. The token service provider identifiers and/or token service provider configuration identifiers may be used with token exchange requests, in order for TES system 350 to determine which configurations to utilize during processing of each token exchange request.

With renewed reference to FIG. 13, the merchant portal 385 may act as an interface for a client (i.e., a merchant), through which configuration data discussed above in reference to FIG. 14 (e.g., configuration instances, and corresponding configuration identifiers and token service provider identifiers) may be provided to TES database 375. Further, merchant portal 385 may enable the client to activate or deactivate (i.e., turn on or off) functionality options for a token exchange service. The client may be able to activate or deactivate the token exchange service via merchant portal 385. If the token exchange service is activated, the client may be given an option to activate or deactivate each token service provider. For example, in the case of merchant system 110 shown in FIG. 14, the client may be able to activate or deactivate each of the token service providers XiSecure, Omni, and WPG-STS. The presentation of the different token service providers may be dynamically driven based upon new data-mapping entries defining the token service providers.

Because DRS system 220 may be the entity that submits token exchange requests to TES system 350, merchant portal 385 and its functionalities discussed throughout the present disclosure may also be available to an operator or a service personnel of DRS system 220. Further, merchant portal 385 may be implemented as part of DRS portal 240, such that a user may configure routing directives as well as token exchange services via a single portal.

Token exchange requests received from DRS system 220 may be application programming interface (API) requests. Such token exchange requests may be referred to as primary token exchange requests throughout the present disclosure. In describing various types of token-related requests generated by DRS system 220 and TES system 350, which will be described in greater detail below, the following designations will be used throughout the present disclosure:

Primary token exchange request: A request generated by DRS system 220 and transmitted to TES system 350, to exchange an input token for an output token. The request may comprise the input token.

Primary token exchange response: A response generated by TES system 350 including an output token exchanged for an input token, and transmitted to DRS system 220.

Ancillary detokenization request: A request generated by TES system 350 (i.e., a TSP adapter thereof) and transmitted to an input token vault (i.e., input token service provider), to detokenize an input token. The request may comprise the input token.

Input token vault (i.e., an input token service provider): A token vault (i.e., a token service provider) that processes an ancillary detokenization request and detokenizes an input token into sensitive data.

Ancillary detokenization response: A response generated by an input token vault including sensitive data extracted from an input token, and transmitted to TES system 350.

Ancillary tokenization request: A request generated by TES system 350 (i.e., a TSP adapter thereof) and transmitted to an output token vault (i.e., output token service provider), to tokenize sensitive data. The request may comprise the sensitive data.

Output token vault (i.e., an output token service provider): A token vault (i.e., a token service provider) that processes an ancillary tokenization request, retrieves/generates an output token that corresponds to sensitive data in the ancillary tokenization request (i.e., "vaulting" the sensitive data), and return the output token.

Ancillary tokenization response: A response generated by an output token vault including an output token retrieved/generated from vaulting the sensitive data, and transmitted to TES system 350.

A primary token exchange request from DRS system 220 may comprise (in the request body, for example) an input token value, an input token service provider configuration identifier, and an output token service provider configuration identifier. An input token value may be the value of the token initially retained and submitted to TES system 350 by merchant system 110. An input token service provider configuration identifier may identify i) the input token service provider that generated the input token and ii) the configuration of the input token service provider. Using the input token service provider configuration identifier, TES system 350 may determine the input token service provider to which the input token needs to be routed, and may also determine which configuration to use in forming an ancillary detokenization request. The ancillary detokenization request may comprise the input token that is routed to the input token service provider. An output token service provider configuration identifier may identify i) the output token service provider that will generate an output token and ii) the configuration of the output token service provider. Using the output token service provider configuration identifier, TES system 350 may determine the output token service provider to which sensitive data received from an input token service provider needs to be routed, and may also determine which configuration to use in forming an ancillary tokenization request. The ancillary tokenization request may comprise the sensitive data that need to be routed to the output token service provider. The output token may be the token that DRS system 220 (or merchant system 110) might be in need of, for example, to process a transaction using a payment processor configured for a token format consistent with the output token. In some embodiments, the primary token exchange request may also comprise supplemental data, such as an expiration date, a card security code, an address and/or a name (that is associated with a payment vehicle, for example), or any information that is supplemental to the sensitive data protected by tokenization. Further, the primary token exchange request may also indicate the payment vehicle type that the primary token exchange request is associated with.

It should be noted, while the input and output token service providers may be determined based on the input and output token service provider configuration identifiers included in primary token exchange requests as explained above, the input and output token service providers may be determined by inferring the input and output token service provider configuration identifiers based on other information or properties included in the primary token exchange requests. A primary token exchange request may thus comprise information or properties that may be used by the TES system 350 to infer input and/or output token service provider configuration identifiers. For example, the TES system 350 may look up a default token service provider destination configuration (i.e., infer input and/or output token service provider configurations) based on the information or properties contained in the primary token exchange request.

With renewed reference to FIG. 13, once the primary token exchange request has been received at API endpoint 355 and authenticated, the primary token exchange request may be further processed by tokenization orchestration logic 360. Tokenization orchestration logic 360 may generate a globally unique identifier (GUID) for each received primary token exchange request. The GUID may be written with any log entries associated with transaction(s) resulting from the primary token exchange request. The GUID and the log entries associated with the GUID may facilitate transaction tracking for troubleshooting purposes. The same GUID may be returned in the primary token exchange response that corresponds to the primary token exchange request. Further, the GUID may be used/submitted by the client (e.g., a merchant or an operator of DRS system 220) via merchant portal 385, in order to investigate the associated transaction(s) using the log entries.

As transaction(s) resulting from a primary token exchange request flow through TES system 350, each milestone or transaction event may be logged. For example, the logged transaction events may include making a call to a token vault, completing a database call, mapping transaction data, request and response data themselves, etc. The log entries may be saved in TES database 375, and may be used as reporting data for the client (e.g., a merchant, or an operator of DRS system 220).

Referring back to FIG. 13, based on the primary token exchange request, tokenization orchestration logic 360 may send instructions to individual TSP adapters 370A-370E via token vault interface 365, the instructions causing the TSP adapters 370A-370E to construct and send ancillary requests to token vaults 380A-380E. In other words, the primary token exchange request may be parsed and/or read by tokenization orchestration logic 360, and instructions may be sent to appropriate TSP adapters by tokenization orchestration logic 360 in order to satisfy the conditions indicated in the primary token exchange request. The resultant requests generated by the TSP adapters may be referred to as ancillary requests. For example, a primary token exchange request may cause appropriate TSP adapters to generate i) an ancillary detokenization request for detokenizing the input token contained in the primary token exchange request (thus retrieving sensitive data from the token), and ii) an ancillary tokenization requests for tokenizing the retrieved sensitive data into an output token.

The ancillary requests may be generated by the appropriate TSP adapters based on the configuration data pertaining to the recipient token service provider(s) specified in the primary token exchange request. The configuration data may be retrieved from TES database 375 using the token service provider configuration identifier(s) included in the primary token exchange request.

Tokenization orchestration logic 360 may also receive, from token vaults 380A-380E via the corresponding TSP adapters 370A-370E, responses to the previously-submitted ancillary requests, and generate a primary token exchange response based on the received responses. A response received by tokenization orchestration logic 360 from a token vault may be called an ancillary response throughout the present disclosure. Depending on whether tokenization or detokenization has been requested, the ancillary response may be called an ancillary tokenization response or an ancillary detokenization response.

Based on the received ancillary responses, tokenization orchestration logic 360 may generate a primary token exchange response. In general, the response body may include the GUID that was created when the primary token exchange request was initially received, and details of the output token returned by the corresponding output token vault. Such details may include an output token service provider identifier ("tokenProvider"), an output token service provider configuration identifier ("profileId"), a token value ("value"), etc. For certain output tokens, details may include additional information such as output token service provider reference identifier ("tokenProviderRefId"), and indication of whether the token is newly created ("newlyCreatedToken"). Further, if there was any error during processing of the token exchange request, details may include an error code ("errorCode") as well as a message describing the error ("message"). The tokenization orchestration logic 360 may transmit the primary token exchange response containing the output token to DRS system 220. DRS system 220 may then store (e.g., cache) the output token in a local storage. DRS system 220 may then update the request message received from merchant system 110 to include the output token that may be compatible with the final destination payment processor. DRS system 220 may transmit the updated request message to the final destination payment processor for further processing.

In some embodiments, DRS system 220 may transmit the output token to merchant system 110, so that merchant system 110 may use the output token in future transactions. Specifically, merchant system 110 may use the output token to utilize payment processors configured for the output token.

During processing of a primary token exchange request and resultant ancillary requests/responses, various components of TES system 350 may encounter error conditions. These error conditions may be reported to tokenization orchestration logic 360, which may subsequently log the error conditions in TES database 375. Further, tokenization orchestration logic 360 may send one or more responses to DRS system 220, each response including one or more status codes indicative of the error(s).

With continuing reference to FIG. 13, token vault interface 365 may be situated between tokenization orchestration logic 360 and TSP adapters 370A-370E, and may be available to both tokenization orchestration logic 360 and TSP adapters 370A-370E. Token vault interface 365 may enable TSP adapters 370A-370E to interface with the tokenization orchestration logic 310 and vice versa. In one embodiment, token vault interface 365 may comprise an API contract that TSP adapters 370A-370E may implement.

TSP adapters 370A-370E may receive instructions to generate ancillary requests from tokenization orchestration logic 360 via token vault interface 365. Each TSP adapter may contain a logic specific to its corresponding token service provider. Therefore, the TSP adapters may generate ancillary requests that conform to the message formats followed by the corresponding token service providers (i.e., corresponding token vaults). Each TSP adapter may receive an ancillary response from the corresponding token vault (i.e., corresponding one of token vaults 380A-380E), and may return the ancillary response or the results derived from the ancillary response (e.g., sensitive data, token, error condition, etc.) to token orchestration logic 360 via token vault interface 365.

Token vaults 380A-380E may each be a data repository/server that stores token-to-sensitive data mapping information for encrypting (e.g., tokenizing) and decrypting (e.g., detokenizing) sensitive data involved in tokenization. In some embodiments, token vaults 380A-380E may actually be token service providers comprising data repositories/servers that store token-to-sensitive data mapping information. Therefore, token vaults 380A-380E may also be referred to as token service providers 380A-380E in the present disclosure. The terms "token service provider" and "token vault" may thus be used interchangeably throughout the present disclosure. As alluded to above, a TSP adapter may generate and transmit an ancillary request to a corresponding token vault, and receive an ancillary response from the token vault. The ancillary response may contain a token, sensitive data, and/or error conditions. The ancillary response or results derived from the ancillary response may then be transmitted to tokenization orchestration logic 360 for further processing.

It should be noted that, although API endpoint 355, tokenization orchestration logic 360, token vault interface 365, and/or TSP adapters 370A-370E are shown as separate components (e.g., application logics) within TES system 350 in FIG. 13, these components may actually be a single component (e.g., an application logic) performing all of the functions described with respect to API endpoint 355, tokenization orchestration logic 360, token vault interface 365, and/or TSP adapters 370A-370E. Such a single component may collectively be referred to as TES orchestration logic 360. However, API endpoint 355, tokenization orchestration logic 360, token vault interface 365, and/or TSP adapters 370A-370E may indeed be separate components within TES system 350. In other words, it should be appreciated that the configurations specifically discussed herein regarding the arrangement and/or the division of the components depicted in FIG. 13 are merely exemplary, and different combinations of components may be implemented on a single device or multiple computing devices to perform the steps described in the present disclosure.

Figure 15:
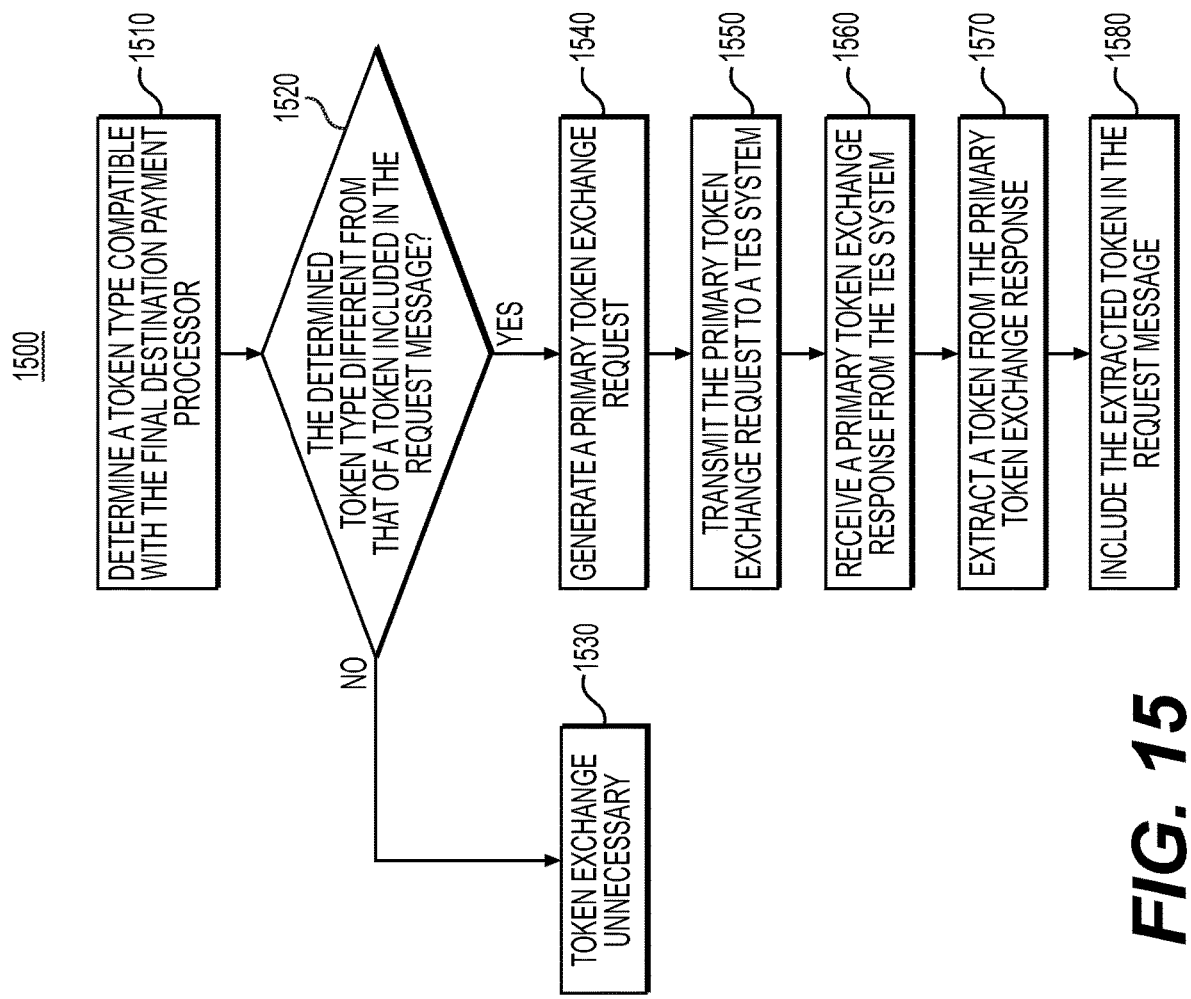
FIG. 15 shows a flowchart illustrating an exemplary method of updating a request message for token compatibility, according to one aspect of the present disclosure.

FIG. 15 shows a flowchart illustrating an exemplary method of updating a request message for token compatibility, according to one aspect of the present disclosure. Notably, method 1500 may be performed by DRS system 220 upon determining a final destination payment processor based on a routing directive. As explained above, method 1500 may be part of the request message updating step illustrated in FIG. 9 and FIG. 10 (i.e., step 970 of FIG. 9 or step 1020 of FIG. 10). In addition to updating the request message to indicate a final destination processor, DRS system 220 may replace the token that was initially included in the request message with a token compatible with the final destination payment processor. Within a token exchange context, the token that was initially included in the request message (e.g., when first received from merchant system 110) may be referred to as an input token, and the token that is compatible with the final destination payment processor may be referred to as an output token.

At step 1510, DRS system 220 may determine a token type compatible with the destination payment processor (i.e., the final destination payment processor determined at step 965 of FIG. 9 or step 1020 of FIG. 10). DRS system 220 may make this determination by requesting relevant information from TES system 350. For example, DRS system 220 may send an identifier associated with the final destination payment processor and may receive information on the token type compatible with the destination payment processor in return.

At step 1520, DRS system 220 may determine whether the token type compatible with the final destination payment processor is different from that of a token included in the request message (i.e., request message received from merchant system 110 at step 710 of FIG. 7). If it is determined that the token type is not different from that of a token included in the request message, method 1500 may proceed to step 1530, where DRS system 220 may conclude that token exchange is unnecessary. Accordingly, DRS system 220 may not generate any primary token exchange request.

If is determined that the token type is different from that of a token included in the request message, method 1500 may instead proceed to step 1540. At step 1540, DRS system 220 may generate a primary token exchange request. The primary token exchange request may comprise the token included in the request message received from merchant system 110 (i.e., an input token). As explained above, the primary token exchange request may also include an input token service provider identifier, an output token service provider identifier, and/or supplemental information. At step 1550, DRS system 220 may transmit the primary token exchange request to TES system 350. TES system 350 may process the primary token exchange request and may obtain an output token compatible with the final destination payment processor. The token exchange process performed by TES system 350 will be described below in reference to FIG. 16.

At step 1560, DRS system 220 may receive a primary token exchange response from TES system 350. The primary token exchange response may comprise a token that is compatible with the final destination payment processor (i.e., an output token). At step 1570, DRS system 220 may extract the token from the primary token exchange response. At step 1580, DRS system 220 may include the extracted token in the request message. DRS system 220 may further remove the token that was initially included in the request message. In other words, DRS system 220 may replace the initial token with a token that is compatible with the final destination payment processor.

Figure 16:
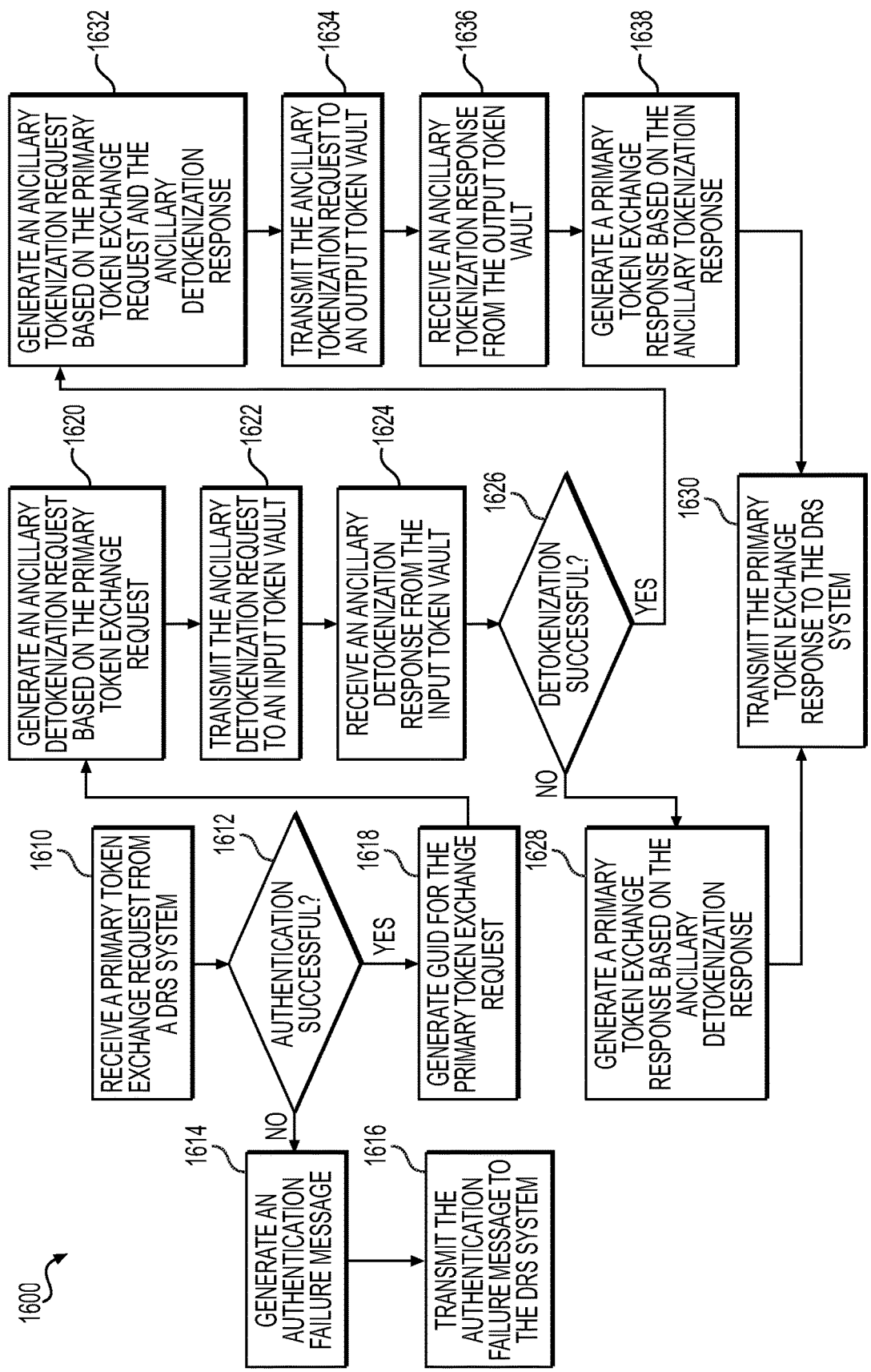
FIG. 16 shows a flowchart illustrating an exemplary method of performing a token exchange, according to one aspect of the present disclosure.

FIG. 16 shows a flowchart illustrating an exemplary method of performing a token exchange, according to one aspect of the present disclosure. Notably, method 1600 may be performed by TES system 350 upon receiving a primary token exchange request from DRS system 220. At step 1610, TES system 350 may receive a primary token exchange request from DRS system 220. As explained above, the primary token exchange request may contain an input token (e.g., input token value). Specifically, the input token may be a token that was included in a request message received from merchant system 110 by DRS system 220. As shown in FIG. 15, DRS system 220 may determine that the token may not be compatible with the final destination payment processor, generate the primary token exchange request including the token (i.e., input token), and transmit the primary token exchange request to TES system 350.

At step 1612, TES system 350 may authenticate the primary token exchange request. If the authentication is unsuccessful, method 1600 may proceed to step 1614, where TES system 350 may generate an authentication failure message. At step 1616, TES system 350 may transmit the authentication failure message to DRS system 220.

If the authentication is successful however, method 1600 may proceed to step 1618, where TES system 350 may generate a GUID for the primary token exchange request. The GUID may be stored in TES database 375. At step 1620, TES system 350 may generate an ancillary detokenization request based on the primary token exchange request. The ancillary detokenization request may contain the input token and may be routed to an input token vault. The input token vault may be identified by the input token service provider configuration identifier included in the primary token exchange request. At step 1622, TES system 350 may transmit the ancillary detokenization request to the input token vault, which contains token-to-sensitive data mapping. The input token vault may determine the sensitive data that correspond to the input token, and return an ancillary detokenization response containing the sensitive data or an error message to TES system 350.

At step 1624, TES system 350 may receive the ancillary detokenization response from the input token vault. At step 1626, TES system 350 may determine whether the detokenization was successful. For example, TES system 350 may determine that the detokenization was unsuccessful if the ancillary detokenization response does not contain the sensitive data, or if the ancillary detokenization response contains an error message indicating detokenization failure. TES system 350 may determine that the detokenization was successful if the ancillary detokenization response contains the sensitive data and no error message indicating detokenization failure. If TES system 350 determines that detokenization was unsuccessful, method 1600 may proceed to step 1628, where TES system 350 may generate a primary token exchange response based on the ancillary detokenization response indicating the detokenization failure. Therefore, the primary token exchange response may indicate the detokenization failure in the response body. At step 1630, TES system 350 may transmit the primary token exchange response to DRS system 220.

If TES system 350 determines that the detokenization was successful, method 1600 may proceed to step 1632 instead. At step 1632, TES system 350 may generate an ancillary tokenization request based on the ancillary detokenization response comprising the sensitive data. Further, the ancillary tokenization request may be generated based on the primary token exchange request, as the primary token exchange request includes an output token service provider configuration identifier and/or supplemental information. Based on the output token service provider configuration identifier, TES system 350 may determine the output token vault to which the ancillary tokenization request may be transmitted. The sensitive data received from the input token vault may be included in the ancillary tokenization request. Further, all or a portion of the supplemental information may also be included in the ancillary tokenization request, if the output token vault may require such supplemental information to generate/retrieve an output token.

At step 1634, TES system 350 may transmit the ancillary tokenization request to the corresponding output token vault (e.g., one of token vaults 380A-380E). The ancillary tokenization request may contain the sensitive data received from the input token vault. The output token vault may generate or retrieve an output token based on the ancillary tokenization request. The output token vault may generate an ancillary tokenization response including the output token and transmit the ancillary tokenization response to TES system 350. If the output token vault is unable to generate or retrieve the output token, the ancillary tokenization response may include a message indicating the tokenization failure.

At step 1636, TES system 350 may receive the ancillary tokenization response from the output token vault. At step 1638, TES system 350 may generate a primary token exchange response based on the ancillary tokenization response. In general, the primary token exchange response may include the output token received from the corresponding output token vault, or any error messages indicating tokenization failure or other errors. At step 1630, TES system 350 may transmit the primary token exchange response to DRS system 220.

As explained above in reference to FIG. 12, if the final destination payment processor does not support tokens, the tokenization steps performed by TES system 350 (e.g., steps 1632-1636 in FIG. 16) may not be necessary. For example, if DRS system 220 determines that the final destination payment processor is not configured for tokens, DRS system 220 may just generate a primary detokenization request (i.e., instead of a primary token exchange request in FIG. 15), and transmit the primary detokenization request to TES system 350. In response, TES system 350 may perform just the steps related to request authentication and detokenization (e.g., steps 1610-1626 in FIG. 16), generate a primary detokenization response based on the results of detokenization (e.g., a response indicating an error condition if detokenization is unsuccessful, or a response including sensitive data if detokenization is successful), and return the primary detokenization response to DRS system 220. DRS system 220 may then extract sensitive data from the primary detokenization response and include the sensitive data in the request message. DRS system 220 may further remove the token that was initially included in the request message. In other words, DRS system 220 may replace the initial token with sensitive data that is accepted at the final destination payment processor.

Unless specifically stated otherwise, as apparent from the following discussions, it is appreciated that throughout the specification discussions utilizing terms such as "processing," "computing," "calculating," "determining", "analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer," a "computing machine," a "computing platform," a "computing device," or a "server" may include one or more processors.

FIG. 17 illustrates an implementation of a computer system designated 1700. The computer system 1700 can include a set of instructions that can be executed to cause the computer system 1700 to perform any one or more of the methods or computer based functions disclosed herein. The computer system 1700 may operate as a standalone device or may be connected, e.g., using a network, to other computer systems or peripheral devices.

In a networked deployment, the computer system 1700 may operate in the capacity of a server or as a client user computer in a server-client user network environment, or as a peer computer system in a peer-to-peer (or distributed) network environment. The computer system 1700 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 1700 can be implemented using electronic devices that provide voice, video, or data communication. Further, while a single computer system 1700 is illustrated, the term "system" shall also be taken to include any collection of systems or sub-systems that individually or jointly execute a set, or multiple sets, of instructions to perform one or more computer functions.

As illustrated in FIG. 17, the computer system 1700 may include a processor 1702, e.g., a central processing unit (CPU), a graphics processing unit (GPU), or both. The processor 1702 may be a component in a variety of systems. For example, the processor 1702 may be part of a standard personal computer or a workstation. The processor 1702 may be one or more general processors, digital signal processors, application specific integrated circuits, field programmable gate arrays, servers, networks, digital circuits, analog circuits, combinations thereof, or other now known or later developed devices for analyzing and processing data. The processor 1202 may implement a software program, such as code generated manually (i.e., programmed).

The computer system 1700 may include a memory 1704 that can communicate via a bus 1708. The memory 1704 may be a main memory, a static memory, or a dynamic memory. The memory 1704 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 1704 includes a cache or random-access memory for the processor 1702. In alternative implementations, the memory 1704 is separate from the processor 1702, such as a cache memory of a processor, the system memory, or other memory. The memory 1704 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 1704 is operable to store instructions executable by the processor 1702. The functions, acts or tasks illustrated in the figures or described herein may be performed by the programmed processor 1702 executing the instructions stored in the memory 1704. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the computer system 1700 may further include a display unit 1710, such as a liquid crystal display (LCD), an organic light emitting diode (OLED), a flat panel display, a solid-state display, a cathode ray tube (CRT), a projector, a printer or other now known or later developed display device for outputting determined information. The display 1710 may act as an interface for the user to see the functioning of the processor 1702, or specifically as an interface with the software stored in the memory 1704 or in the drive unit 1706.

Additionally or alternatively, the computer system 1700 may include an input device 1712 configured to allow a user to interact with any of the components of system 1700. The input device 1712 may be a number pad, a keyboard, or a cursor control device, such as a mouse, or a joystick, touch screen display, remote control, or any other device operative to interact with the computer system 1700.

The computer system 1700 may also or alternatively include a disk or optical drive unit 1706. The disk drive unit 1706 may include a computer-readable medium 1722 in which one or more sets of instructions 1724, e.g. software, can be embedded. Further, the instructions 1724 may embody one or more of the methods or logic as described herein. The instructions 1724 may reside completely or partially within the memory 1704 and/or within the processor 1702 during execution by the computer system 1700. The memory 1704 and the processor 1702 also may include computer-readable media as discussed above.

In some systems, a computer-readable medium 1722 includes instructions 1724 or receives and executes instructions 1724 responsive to a propagated signal so that a device connected to a network 1770 can communicate voice, video, audio, images, or any other data over the network 1770. Further, the instructions 1724 may be transmitted or received over the network 1770 via a communication port or interface 1720, and/or using a bus 1708. The communication port or interface 1720 may be a part of the processor 1702 or may be a separate component. The communication port 1720 may be created in software or may be a physical connection in hardware. The communication port 1720 may be configured to connect with a network 1770, external media, the display 1710, or any other components in system 1700, or combinations thereof. The connection with the network 1770 may be a physical connection, such as a wired Ethernet connection or may be established wirelessly as discussed below. Likewise, the additional connections with other components of the system 1700 may be physical connections or may be established wirelessly. The network 1770 may alternatively be directly connected to the bus 1708.

While the computer-readable medium 1722 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 1722 may be non-transitory, and may be tangible.

The computer-readable medium 1722 can include a solid-state memory such as a memory card or other package that houses one or more non-volatile read-only memories. The computer-readable medium 1722 can be a random-access memory or other volatile re-writable memory. Additionally or alternatively, the computer-readable medium 1722 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 1700 may be connected to one or more networks 1770. The network 1770 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 1770 may include wide area networks (WAN), such as the Internet, local area networks (LAN), campus area networks, metropolitan area networks, a direct connection such as through a Universal Serial Bus (USB) port, or any other networks that may allow for data communication. The network 1770 may be configured to couple one computing device to another computing device to enable communication of data between the devices. The network 1770 may generally be enabled to employ any form of machine-readable media for communicating information from one device to another. The network 1770 may include communication methods by which information may travel between computing devices. The network 1770 may be divided into sub-networks. The sub-networks may allow access to all of the other components connected thereto or the sub-networks may restrict access between the components. The network 1770 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A computer-implemented method for dynamic routing of electronic transactions while maintaining token compatibility, comprising:
   receiving a request message from a merchant system;
   determining, by searching a database, that an error-based routing directive is associated with the request message;
   transmitting the request message to an initial destination payment processor;
   storing a time of transmission of the request message in the database;
   receiving a response message from the initial destination payment processor;
   storing the time of receipt of the response message in the database;
   determining the initial destination payment processor is unresponsive based on the received response message;
   retrieving one or more status codes associated with the received response message and the time of receipt of the received response message associated with the one or more status codes, wherein the one or more status codes and the time of receipt associated with the one or more status codes are associated with the error-based routing directive based on determining the initial destination payment processor is unresponsive;
   retrieving contextual data associated with the error-based routing directive, wherein the contextual data is based on a destination selection criteria specified in the error-based routing directive;
   determining a final destination payment processor based on the error-based routing directive associated with the request message and the retrieved contextual data;
   updating the request message based on the final destination payment processor and based on the error-based routing directive being associated with only at least one of the one or more status code, the updating comprising:
      updating a message destination to the final destination payment processor by altering a message payload to update the message destination to the final destination payment processor, and wherein altering the message payload to update the message destination to the final destination payment processor comprises:
         updating an initial destination payment processor identifier to a final destination payment processor identifier;
      replacing an initial token with a token that is compatible with the final destination payment processor; and
   transmitting the updated request message to a downstream entity.

2. The method of claim 1, wherein replacing the initial token with the token that is compatible with the final destination payment processor comprises:
   determining a token type compatible with the final destination payment processor;
   determining that the token type is different from that of the initial token;
   transmitting a primary token exchange request to a tokenization exchange service (TES) system;
   receiving a primary token exchange response from the TES system; and
   extracting the token that is compatible with the final destination payment processor from the primary token exchange response.

3. The method of claim 2, wherein the TES system is configured to generate an ancillary detokenization request and an ancillary tokenization request.

4. The method of claim 3, wherein the ancillary detokenization request comprises the initial token and the ancillary tokenization request comprises sensitive data corresponding to the initial token.

5. The method of claim 1, wherein the routing directive is configured by a user via a web-based portal.

6. A system for dynamic routing of electronic transactions while maintaining token compatibility, the system comprising:
   at least one processor;
   at least one data storage comprising instructions which, when executed by the at least one processor, cause the at least one processor to perform a method comprising:
      receiving a request message from a merchant system, the request message associated with an error-based routing directive;
      determining, by searching a database, that an error-based routing directive is associated with the request message;

transmitting the request message to an initial destination payment processor;
storing a time of transmission of the request message in the database;
receiving a response message from the initial destination payment processor;
storing the time of receipt of the response message in the database;
determining the initial destination payment processor is unresponsive based on the received response message;
retrieving one or more status codes associated with the received response message and the time of receipt of the received response message associated with the one or more status codes, wherein the one or more status codes and the time of receipt associated with the one or more status codes are associated with the error-based routing directive based on determining the initial destination payment processor is unresponsive;
retrieving contextual data associated with the error-based routing directive, wherein the contextual data is based on a destination selection criteria specified in the error-based routing directive;
determining a final destination payment processor based on the error-based routing directive associated with the request message and the retrieved contextual data;
updating the request message based on the final destination payment processor and based on the error-based routing directive being associated with only at least one of the one or more status code, the updating comprising:
updating a message destination to the final destination payment processor by altering a message payload to update the message destination to the final destination payment processor, wherein altering the message payload to update the message destination to the final destination payment processor comprises:
updating an initial destination payment processor identifier to a final destination payment processor identifier;
replacing an initial token with a token that is compatible with the final destination payment processor; and
transmitting the updated request message to a downstream entity.

7. The system of claim 6, wherein replacing the initial token with the token that is compatible with the final destination payment processor comprises:
determining a token type compatible with the final destination payment processor;
determining that the token type is different from that of the initial token;
transmitting a primary token exchange request to a tokenization exchange service (TES) system;
receiving a primary token exchange response from the TES system; and
extracting the token that is compatible with the final destination payment processor from the primary token exchange response.

8. The system of claim 7, wherein the TES system is configured to generate an ancillary detokenization request and an ancillary tokenization request.

9. The system of claim 8, wherein the ancillary detokenization request comprises the initial token and the ancillary tokenization request comprises sensitive data corresponding to the initial token.

10. The system of claim 6, wherein the downstream entity is a payment gateway.

11. A non-transitory computer readable medium for dynamic routing of electronic transactions while maintaining token compatibility, the non-transitory computer readable medium comprising instructions which, when executed by at least one processor, cause the at least one processor to perform a method comprising:
receiving a request message from a merchant system;
determining, by searching a database, that an error-based routing directive is associated with the request message;
transmitting the request message to an initial destination payment processor;
storing a time of transmission of the request message in the database;
receiving a response message from the initial destination payment processor;
storing the time of receipt of the response message in the database;
determining the initial destination payment processor is unresponsive based on the received response message;
retrieving one or more status codes associated with the received response message and the time of receipt of the received response message associated with the one or more status codes, wherein the one or more status codes and the time of receipt associated with the one or more status codes are associated with the error-based routing directive based on determining the initial destination payment processor is unresponsive;
retrieving contextual data associated with the error-based routing directive, wherein the contextual data is based on a destination selection criteria specified in the error-based routing directive;
determining a final destination payment processor based on the error-based routing directive associated with the request message and the retrieved contextual data;
updating the request message based on the final destination payment processor and based on the error-based routing directive being associated with only at least one of the one or more status code, the updating comprising:
updating a message destination to the final destination payment processor by altering a message payload to update the message destination to the final destination payment processor, wherein altering the message payload to update the message destination to the final destination payment processor comprises:
updating an initial destination payment processor identifier to a final destination payment processor identifier;
replacing an initial token with a token that is compatible with the final destination payment processor; and
transmitting the updated request message to a downstream entity.

12. The non-transitory computer readable medium of claim 11, wherein replacing the initial token with the token that is compatible with the final destination payment processor comprises:
determining a token type compatible with the final destination payment processor;

determining that the token type is different from that of the initial token;

transmitting a primary token exchange request to a tokenization exchange service (TES) system;

receiving a primary token exchange response from the TES system; and extracting the token that is compatible with the final destination payment processor from the primary token exchange response.

13. The non-transitory computer readable medium of claim 12, wherein the TES system is configured to generate an ancillary detokenization request and an ancillary tokenization request.

14. The non-transitory computer readable medium of claim 13, wherein the ancillary detokenization request comprises the initial token and the ancillary tokenization request comprises sensitive data corresponding to the initial token.

15. The method of claim 1, wherein the error-based routing directive is applied to the request message only upon return of a response message from the initial destination payment processor including the one or more status codes, and wherein the one or more status codes include any of a numeric, alphabetical, or alphanumeric character sequence representative of an error type.

16. The system of claim 6, wherein the error-based routing directive is applied to the request message only upon return of a response message from the initial destination payment processor including the one or more status codes, and wherein the one or more status codes include any of a numeric, alphabetical, or alphanumeric character sequence representative of an error type.

17. The non-transitory computer readable medium of claim 11, wherein the error-based routing directive is applied to the request message only upon return of a response message from the initial destination payment processor including the one or more status codes, and wherein the one or more status codes include any of a numeric, alphabetical, or alphanumeric character sequence representative of an error type.

* * * * *